(12) United States Patent
Arumugam et al.

(10) Patent No.: US 11,909,475 B2
(45) Date of Patent: Feb. 20, 2024

(54) METHODS PROVIDING WIRELESS COMMUNICATIONS USING RADIO STRIPES AND RELATED CONTROLLERS AND SYSTEMS

(71) Applicant: Telefonaktiebolaget LM Ericsson (publ), Stockholm (SE)

(72) Inventors: Senthamiz Selvi Arumugam, Solna (SE); Ramamurthy Badrinath, Bangalore Karnataka (IN); Ankit Jauhari, Bangalore (IN); Anusha Pradeep Mujumdar, Bangalore (IN); Vijaya Yajnanarayana, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 17/773,659

(22) PCT Filed: Nov. 2, 2019

(86) PCT No.: PCT/IN2019/050810
§ 371 (c)(1),
(2) Date: May 2, 2022

(87) PCT Pub. No.: WO2021/084546
PCT Pub. Date: May 6, 2021

(65) Prior Publication Data
US 2022/0393733 A1    Dec. 8, 2022

(51) Int. Cl.
*H04L 23/02*    (2006.01)
*H04B 7/06*    (2006.01)
(Continued)

(52) U.S. Cl.
CPC ........... *H04B 7/0602* (2013.01); *H04B 7/022* (2013.01); *H04B 7/0802* (2013.01); *H04W 16/28* (2013.01)

(58) Field of Classification Search
CPC ... H04B 7/0617; H04B 5/0012; H04W 88/04; H04W 24/08; H04W 4/08; H04W 48/10; H04L 1/0054; H04L 1/005
(Continued)

(56) References Cited

U.S. PATENT DOCUMENTS 7,620,424 B2    11/2009 Cetiner et al.
2013/0225216 A1    8/2013 Calin et al.
(Continued)

FOREIGN PATENT DOCUMENTS

CN    101438508 A    5/2009
CN    104247490 A    12/2014
(Continued)

OTHER PUBLICATIONS

Extended European Search Report, European Patent Application No. 19950446.5, dated Jun. 23, 2023, 11 pages.
(Continued)

*Primary Examiner* — Khai Tran
(74) *Attorney, Agent, or Firm* — Sage Patent Group

(57) ABSTRACT

Methods provide wireless communication using a plurality of Antenna Processing Units APUs distributed along a radio stripe and sharing a bus along the radio stripe. Access is provided to a plurality of APU activation/deactivation states for a respective plurality of environmental conditions, wherein each one of the plurality of APU activation/deactivation states defines APUs of the plurality of APUs that are activated and APUs of the plurality of APUs that are deactivated for the respective one of the plurality of environmental conditions. Responsive to detecting a first one of the plurality of environmental conditions, a first one of the plurality of APU activation/deactivation states corresponding to the first one of the plurality of environmental conditions is applied to activate a first subset of the APUs and to
(Continued)

deactivate a second subset of the APUs, wherein the first and second subsets of APUs are mutually exclusive.

20 Claims, 20 Drawing Sheets

(51) Int. Cl.
    *H04B 7/022* (2017.01)
    *H04B 7/08* (2006.01)
    *H04W 16/28* (2009.01)

(58) Field of Classification Search
    USPC .................................. 375/262, 260, 267
    See application file for complete search history.

(56) References Cited

U.S. PATENT DOCUMENTS

| | | | |
|---|---|---|---|
| 2020/0392802 A1* | 12/2020 | Quero | E21B 17/18 |
| 2021/0037447 A1* | 2/2021 | Tarighat Mehrabani | H04W 40/248 |
| 2021/0051710 A1* | 2/2021 | Cirik | H04L 5/0023 |

FOREIGN PATENT DOCUMENTS

| | | |
|---|---|---|
| CN | 109565687 A | 4/2019 |
| CN | 110326327 A | 10/2019 |
| WO | 2018103897 A1 | 6/2018 |
| WO | 2018103897 A9 | 6/2018 |
| WO | 2019053291 A1 | 3/2019 |

OTHER PUBLICATIONS

Soszka, M., et al., "Energy Efficiency Optimization for 2D Antenna Arrays in Self-Organizing Wireless Networks," IEEE Wireless Communications and Networking Conference (WCNC 2016)—Track 2—MAC and Cross Layer Design, Apr. 3, 2016 (XP032959488) 7 pages.
International Search Report and Written Opinion of the International Searching Authority, PCT/IN2019/050810, dated Feb. 17, 2020, 12 pages.
Ngo, H. Q., et al.,"On the Total Energy Efficiency of Cell-Free Massive MIMO," IEEE Transactions on Green Communications and Networking, vol. 2, No. 1, Mar. 31, 2018, 15 pages.
Interdonato, G., et al., "Ubiquitous cell-free Massive MIMO communications," EURASIP Journal on Wireless Communications and Networking (2019) 2019:197, https://doi.org/10.1186/s13638-019-1507-0, 13 pages.
Powell, M., "Distributed Massive MIMO using EricssonRadio Stripes," Molly Powell Updates, Apr. 9, 2018, 4 pages.
Ernfors, E., "Radio Stripes: re-thinking mobilenetworks," Ericsson Blog, Feb. 25, 2019, 8 pages.
Singh, P., et al., "Various Strategies for 4G Cellular Tower Placement: A Review," International Journal of Electrical and Electronic Engineering & Telecommunications, vol. 6, No. 1, Jan. 2017, 5 pages.
Chiaraviglio, L., et al., "What Is the Best Spatial Distribution to Model Base Station Density? A Deep Dive Into Two European Mobile Networks," IEEE Digital Object Magnifier, vol. 4, 2016, 10 pages.
Office Action, Chinese Patent Application No. 201980101944.9, dated Nov. 24, 2023, 6 pages.

* cited by examiner

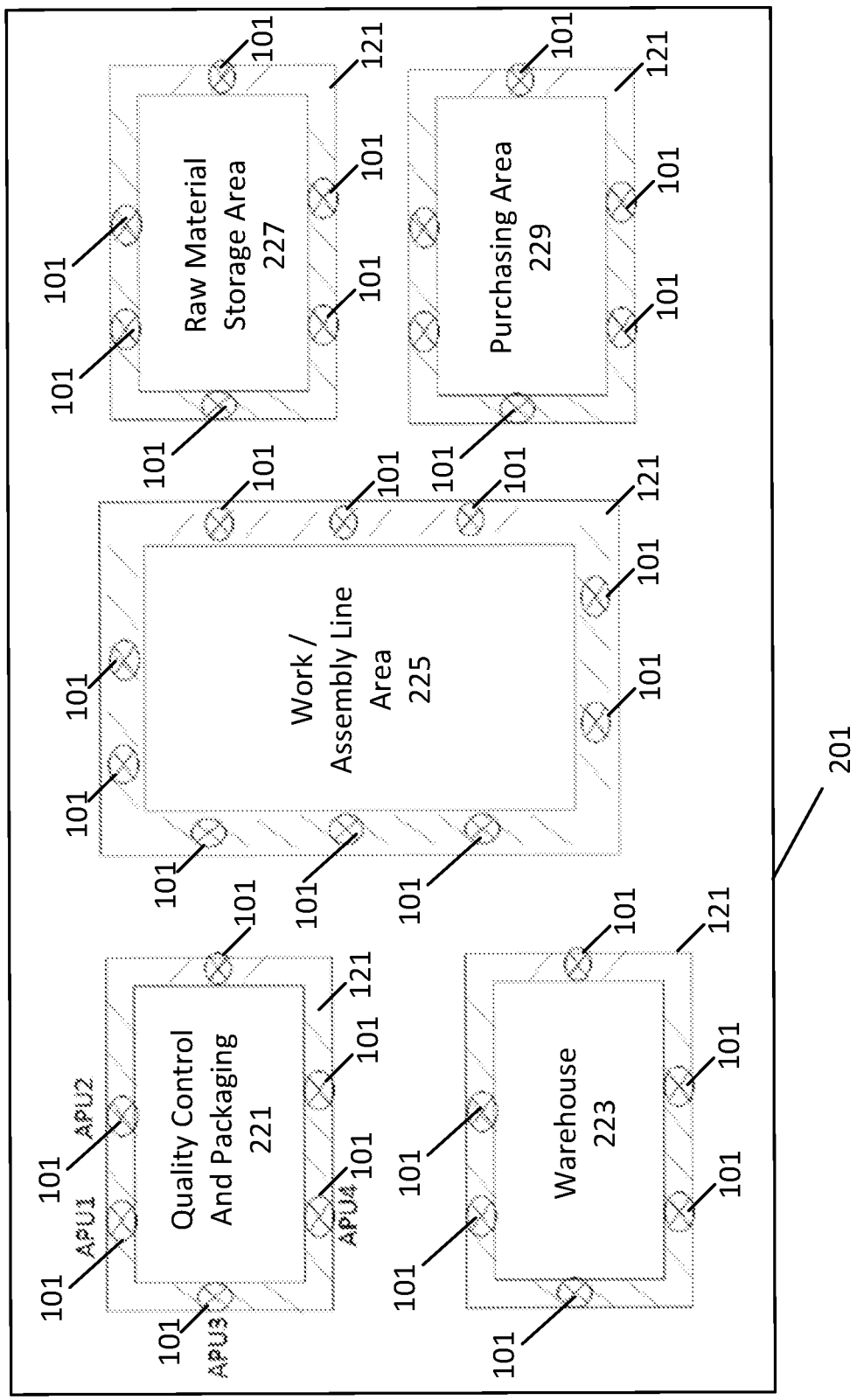

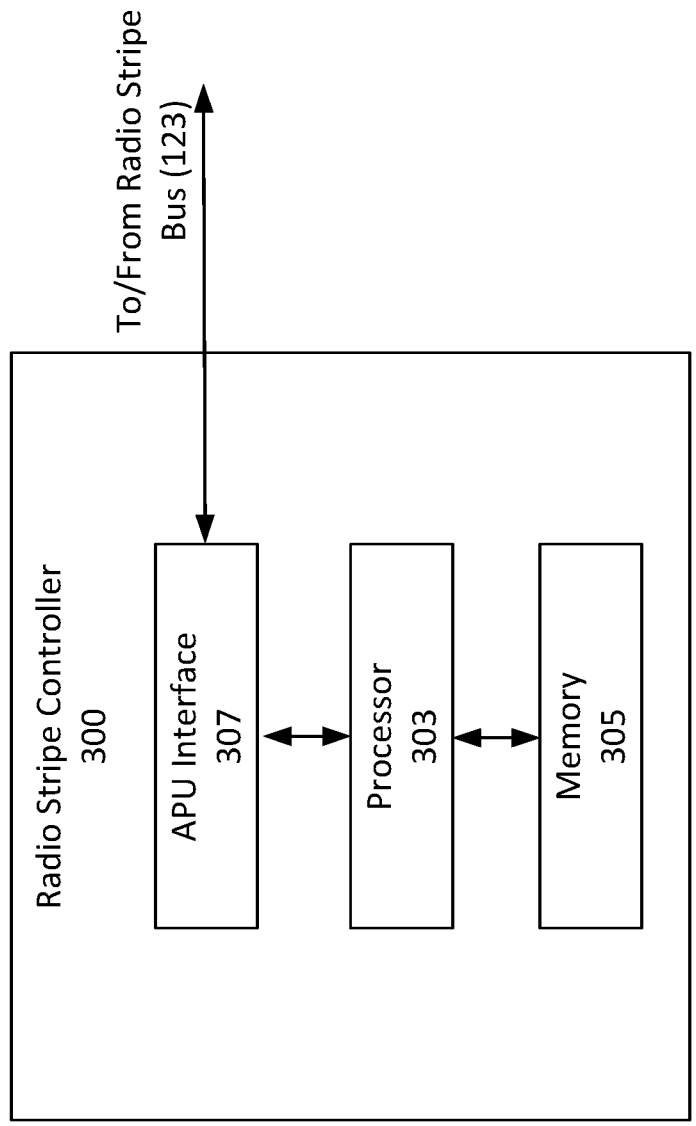

Training phase

Prediction phase

METHODS PROVIDING WIRELESS COMMUNICATIONS USING RADIO STRIPES AND RELATED CONTROLLERS AND SYSTEMS

CROSS REFERENCE TO RELATED APPLICATIONS

This application is a 35 U.S.C. § 371 national stage application of PCT International Application No. PCT/IN2019/050810 filed on Nov. 2, 2019, the disclosure and content of which is incorporated by reference herein in its entirety.

TECHNICAL FIELD

The present disclosure relates generally to communications, and more particularly to communication methods and related devices and nodes supporting wireless communications.

BACKGROUND

In places where connectivity may be crucial and which may undergo constant change, there may need to be a provision to dynamically build networks on the go or which can automatically configure themselves to give a better service and/or meet service level agreement (SLA) demands in a business.

In order to enable several 5G ($5^{th}$ Generation) use-cases, the network should desirably provide high reliability and high capacity with low latency. Coupled with this, the network coverage should also desirably provide connectivity at all times as this may be significant to achieve increased efficiency. For example, many 5G use-cases such as industrial control, remote manufacturing, etc., may not be feasible without enhanced network connectivity. There exist several methods to enhance coverage and/or connectivity. For example, coverage may be increased by adding more base-stations, and/or by increasing power fed to existing base stations.

One example is in the Smart Manufacturing domain where shop-floor layout positioning may be crucial to meet the demands of the modern market. To simplify deployment of 5G networks, Radio Stripes may be very useful as discussed for example by Ernfors in the publication "Radio Stripes: re-thinking mobile networks," cited below as Reference [3]. The Ericsson Radio Stripe system is a visionary take on the conventional idea of antennas and base stations. This revolutionary new mobile network design may be super-distributed and may provide the potential to deliver better quality, as well as making for easier deployment. At a nearly invisible form factor, it may enable ubiquitous high capacity radio everywhere.

Site and frequency planning may be used to determine the powers, locations, and frequency-layers for the base station deployments. Approaches have been discussed by: Chiaravigli, et al. in the publication "What Is the Best Spatial Distribution to Model Base Station Density? A Deep Dive Into Two European Mobile Networks," cited below as Reference [1]; and Singh et al. in the publication "Various Strategies for 4G Cellular Tower Placement: A Review," cited below as Reference [2]. For example, a strategy can be used to position the base-stations based on statistics such as population density collected from various sources as discussed in References [1] and [2]. These kinds of static deployments may be inefficient as the demand for capacity and coverage may be very dynamic. This issue may be addressed using techniques such as beam-forming, etc., when the change is gradual. However, when there is a significant jump in coverage and/or connectivity, the current approaches may be inefficient. Coupled with this, changing deployment by installing new base stations and/or with antenna techniques may be costly and/or complex.

Currently, networks may be manually configured per SLA requirements which may not be very efficient. A good network installation may provide/ensure that both hardware and software components work efficiently to achieve business goals. With advancements in technologies such as 5G, IoT (Internet of Things), etc., demand on network connectivity may be crucial. There exist methods to improve coverage. One solution can be installation of multiple base stations, antennas, etc., but this may result in complications with respect to managing and/or maintaining connectivity.

SUMMARY

According to some embodiments of inventive concepts, methods may provide wireless communication using a plurality of Antenna Processing Units (APUs) distributed along a radio stripe and sharing a bus along the radio stripe. Access is provided to a plurality of APU activation/deactivation states for a respective plurality of environmental conditions, wherein each one of the plurality of APU activation/deactivation states defines APUs of the plurality of APUs that are activated and APUs of the plurality of APUs that are deactivated for the respective one of the plurality of environmental conditions. Responsive to detecting a first one of the plurality of environmental conditions, a first one of the plurality of APU activation/deactivation states corresponding to the first one of the plurality of environmental conditions is applied to activate a first subset of the APUs and to deactivate a second subset of the APUs, wherein the first and second subsets of APUs are mutually exclusive.

According to some other embodiments of inventive concepts, a wireless communication system includes a radio stripe and a controller. The radio stripe include a plurality of Antenna Processing Units APUs distributed along the radio stripe and a bus coupled with the plurality of APUs along the radio stripe. The controller is coupled with the plurality of APUs of the radio stripe using the bus. The controller is configured to provide access to a plurality of APU activation/deactivation states for a respective plurality of environmental conditions, wherein each one of the plurality of APU activation/deactivation states defines APUs of the plurality of APUs that are activated and APUs of the plurality of APUs that are deactivated for the respective one of the plurality of environmental conditions. The controller is also configured to apply a first one of the plurality of APU activation/deactivation states corresponding to a first one of the plurality of environmental conditions to activate a first subset of the APUs and to deactivate a second subset of the APUs responsive to detecting the first one of the plurality of environmental conditions, wherein the first and second subsets of APUs are mutually exclusive.

According to still other embodiments of inventive concepts, a controller is provided for a wireless communication system including a radio stripe having a plurality of Antenna Processing Units APUs distributed along the radio stripe and a bus that provides coupling between the controller and the plurality of APUs. The controller includes processing circuitry, and memory coupled with the processing circuitry. The memory includes instructions that when executed by the processing circuitry causes the controller to provide access to a plurality of APU activation/deactivation states for a respective plurality of environmental conditions, wherein each one of the plurality of APU activation/deactivation states defines APUs of the plurality of APUs that are activated and APUs of the plurality of APUs that are deactivated for the respective one of the plurality of environmental conditions. The memory includes instructions that when executed by the processing circuitry causes the controller to apply a first one of the plurality of APU activation/deactivation states corresponding to a first one of the plurality of environmental conditions to activate a first subset of the APUs and to deactivate a second subset of the APUs responsive to detecting the first one of the plurality of environmental conditions, wherein the first and second subsets of APUs are mutually exclusive.

According to some embodiments, interference management may be improved, throughput performance may be increased, network adaptability for a dynamic channel may be improved, and/or power utilization may be improved.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 2 is a diagram illustrating a shop floor layout in a factory according to some embodiments of inventive concepts;

FIG. 3A is a block diagram illustrating a radio stripe controller according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

According to some embodiments of inventive concepts, machine learning methods using artificial intelligence (AI) techniques such as reinforcement learning and radio stripes are proposed to address issues regarding known systems. Proposed approaches may provide advantages of easier deployment with low complexity and/or high efficiency.

Radio stripes technology can address/overcome some of these challenges as discussed in Reference [3]. However, there does not exist an intelligent approach that determines which antenna processing units (APUs) are to be selected, which cater to the distinct characteristics of radio stripes. Without intelligent switching, there could be significant under availability (resulting in SLAs not being met) or over availability (resulting in significant power inefficiencies).

Some embodiments of inventive concepts may provide machine learning-based intelligent placement of radio stripes and mechanisms to switch the APU's (on the stripes) on/off (activated/deactivated) based on the recommendation of the Machine Learning (ML) agent/system.

Radio Stripes are based on the concept of Distributed multiple input and multiple output (MIMO) deployments that combine benefits of two worlds. These benefits may include beamforming gains and spatial interference suppression capability of conventional Massive MIMO and co-located arrays, and an increased chance of being physically close to a service antenna that smaller cells may offer. The design of a Radio Stripes System is illustrated in FIGS. 1A, 1B, and 1C, where each radio stripe 121 receives/sends data to/from one or multiple Controllers 300 (Central Processing Units CPUs) through a shared/common bus 123 which also provides synchronization and power supply to each APU 101 as discussed, for example, by Powell in the publication "Distributed Massive MIMO using Ericsson Radio Stripes," cited below as Reference [4].

Figure 1A:
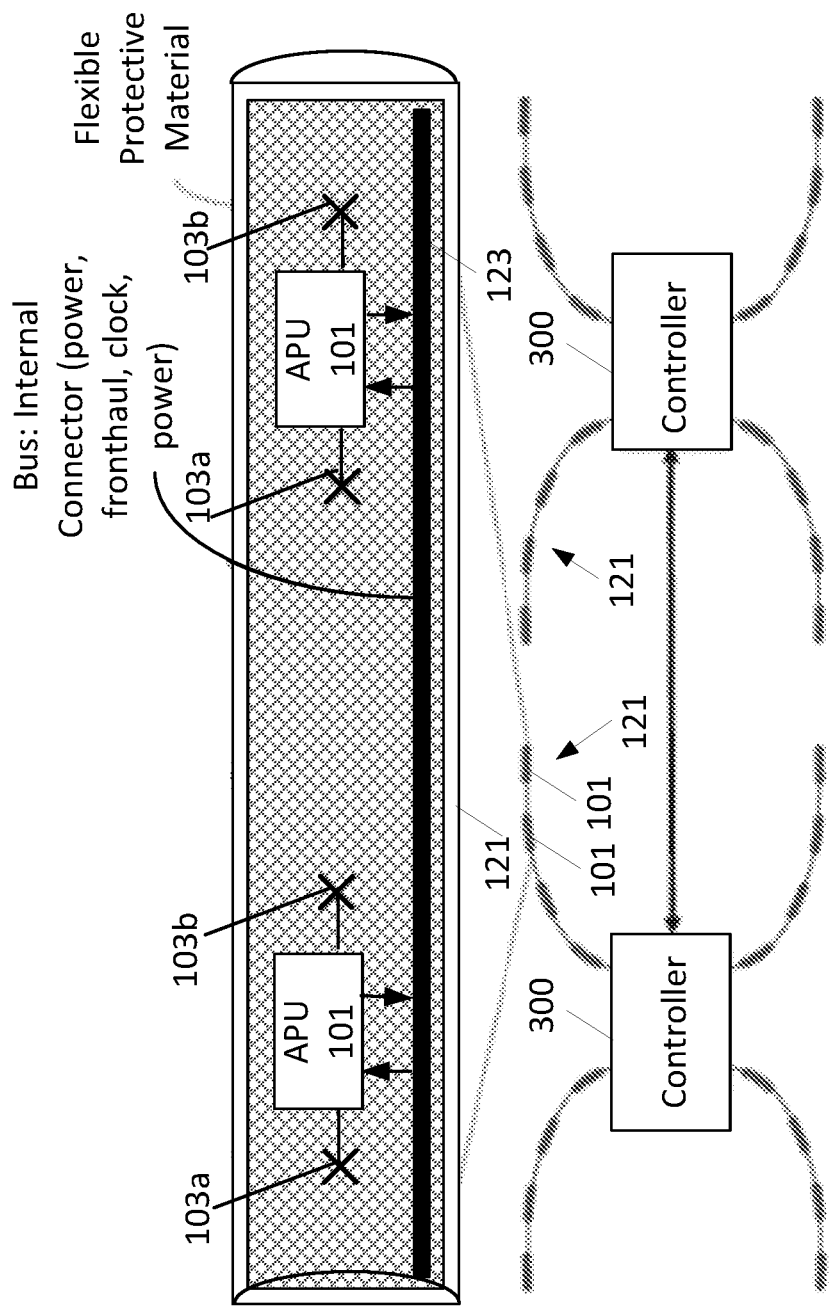
FIG. 1A is schematic diagram illustrating a wireless communication including radio stripes and controllers according to some embodiments of inventive concepts.
Figure 1B:
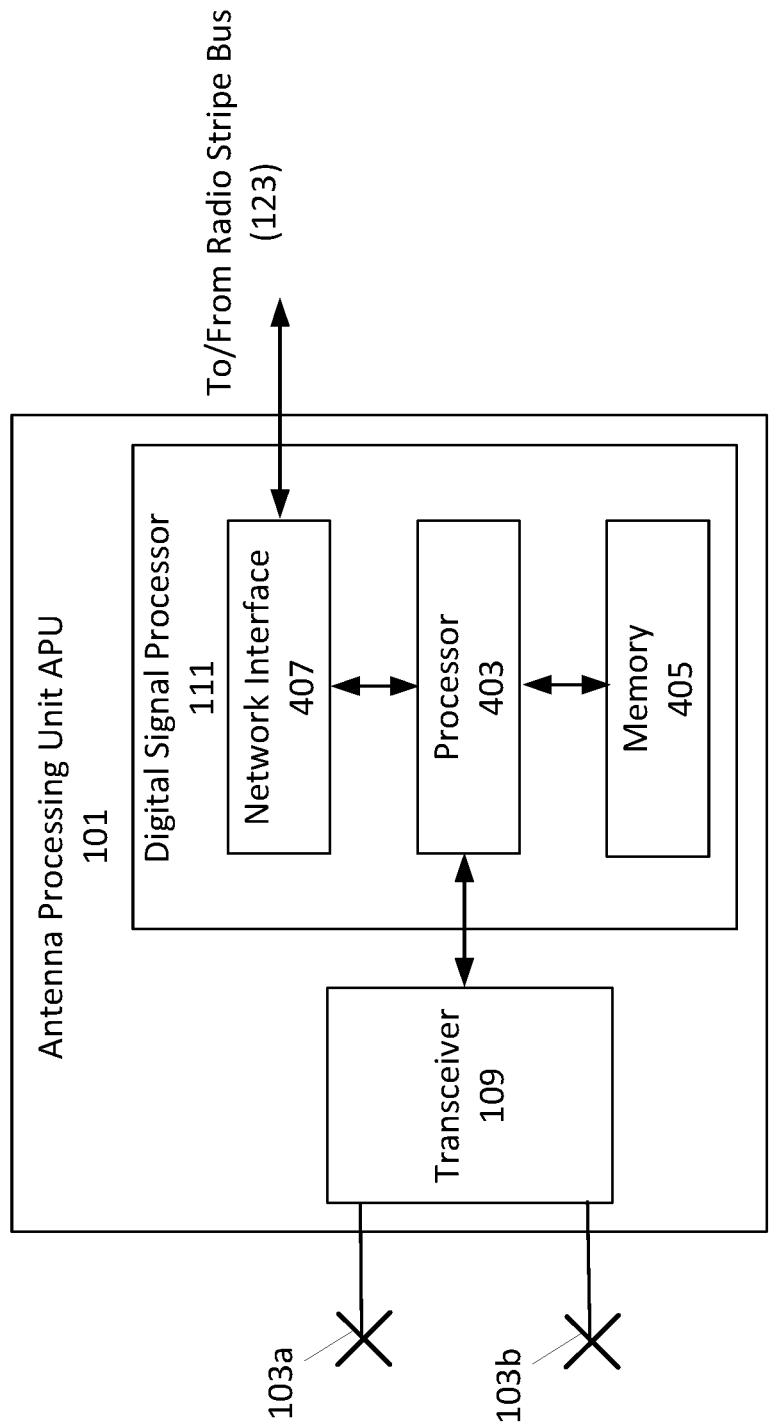
FIG. 1B is a block diagram illustrating an Antenna Processing Unit APU of the radio stripe of FIG. 1A according to some embodiments of inventive concepts.
Figure 1C:
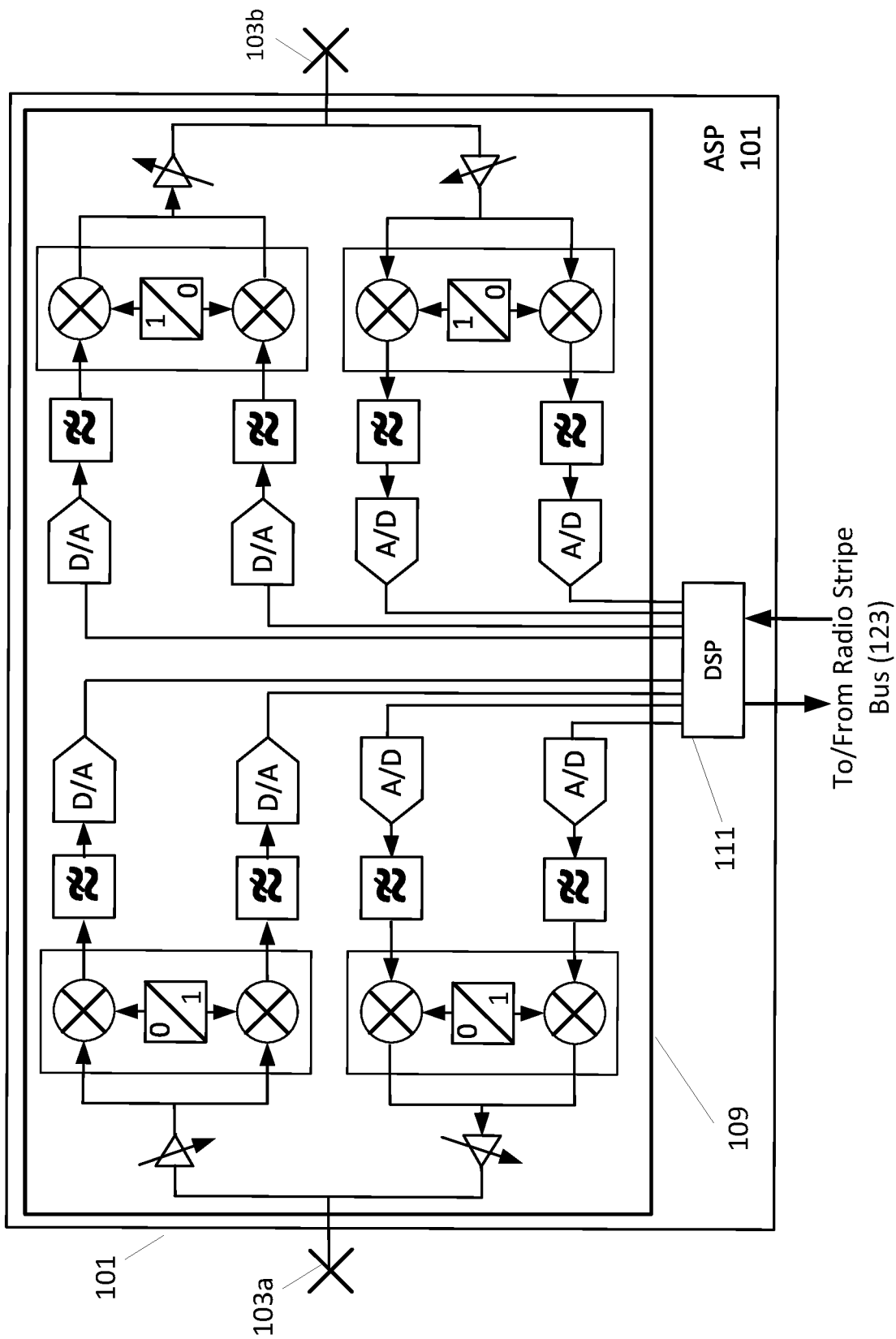
FIG. 1C is a schematic diagram illustrating the APU of FIG. 1B according to some embodiments of inventive concepts.

FIG. 1B is a block diagram illustrating elements of an APU 101 from FIG. 1A according to some embodiments of inventive concepts. That is configured to provide wireless communication according to embodiments of inventive concepts. As shown, APU 101 may include transceiver circuitry 109 (also referred to as a transceiver) including a transmitter and a receiver configured to provide uplink and downlink radio communications with user equipments UEs through antennas 103a and 103b. APU 101 may also include a digital signal processor (DSP) 111 coupled between transceiver 109 and bus 123. DSP 111 may include network interface circuitry 407 (also referred to as a network interface) configured to provide communications with controller 300 via bus 123. DSP 111 may also include processing circuitry 403 (also referred to as processor) coupled to the transceiver circuitry and to the network interface circuitry, and memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

Processor 403 may thus receive control information from controller 300 via network interface 407 and bus 123 to facilitate transmission of downlink communications received from controller 300 and transmitted through transceiver 109 and antennas 103a and 103b to user equipments and to facilitate reception of uplink communications from antennas 103a and 103b and transceiver 109 that is forwarded through network interface 407 and bus 123 to controller 300. As discussed in greater detail below, each APU may be activated or deactivated according to an APU activation/deactivation states that is applied by controller 300 based on the current environmental condition.

According to some embodiments, bus 123 may include a separate power connection for each APU allowing controller 300 to separately apply power to activated APUs while blocking power to deactivated APUs. Accordingly, controller 300 may turn APU 101 on (to activate APU 101) or off (to deactivate APU 101) according to the current APU activation/deactivation state by applying or blocking power to APU 101.

According to some other embodiments, processor 403 may receive an activation instruction from controller 300 (via bus 123 and network interface 407) in response to which APU 101 is activated so that processor 403 fully turns on to power both digital signal processor 111 and transceiver 109. In such embodiments, processor 403 may receive a deactivation instruction from controller 300 (via bus 123 and network interface 407) in response to which processor 403 turns off transceiver 109 (or portions thereof) while maintaining power to DSP 111. By maintaining power to digital signal processor 111 (or portions thereof) while APU 101 is deactivated, processor 403 and/or network interface 407 can monitor signaling on bus 123 for a later activation instruction from controller 300, so that separate power couplings for each APU may be omitted.

According to still other embodiments, controller 300 may control activation/deactivation states of APU 101 by configuring APU 101 to provide communication while activated and by configuring APU 101 to remain idle while deactivated (without turning power off for deactivated APUs, either whole or in part).

FIG. 1C illustrates APU 101 with greater detail provided with respect to transceiver 109.

FIG. 3 is a block diagram illustrating elements of controller 300 from FIG. 1A according to embodiments of inventive concepts.

As shown, controller 300 may include APU interface circuitry 307 (also referred to as an APU interface) configured to provide communications with APUs 101 via bus 123. Controller 300 may also include a processing circuitry 303 (also referred to as a processor) coupled to the APU interface circuitry, and memory circuitry 305 (also referred to as memory) coupled to the processing circuitry 303. The memory circuitry 305 may include computer readable program code that when executed by the processing circuitry 303 causes the processing circuitry 303 to perform operations according to embodiments disclosed herein (e.g., as discussed below with respect to FIG. 8). According to other embodiments, processing circuitry 303 may be defined to include memory so that a separate memory circuitry is not required.

The radio stripe wireless communication system may facilitate a flexible and reduced cost cell-free Massive MIMO deployment. The cost reduction may be due to one or more of the following factors:

Deployment may not require highly qualified personnel.
The absence of cabling between the access point (AP)s (also referred to as Antenna Processing Units 101) and controller 300 (also referred to as a central processing unit CPU) in a radio stripe system (RSS) may result in reduced expense.
Maintenance costs may be reduced because a radio stripe system may offer increased robustness and/or resilience
Reduced heat-dissipation may facilitate cooling systems that are less complex and/or cheaper.

With the above advantages of RSS coupled with a machine learning ML agent that learns from various parameters such as previous user equipment (UE) requirements, positioning data, Service Level Agreements SLA's etc., systems are proposed that may opportunistically turns the APU's 101 ON/OFF on the Radio Stripes 121.

According to some embodiments of inventive concepts, one or more of the following advantages may be provided: Improved interference management; Increased throughput performance; Improved adaptability of the network for a dynamic channel; and/or Improved power utilization.

In order to explain approaches according to some embodiments of inventive concepts, a factory shop-floor layout in a factory is discussed with respect to FIG. 2. As shown in FIG. 2, a shop-floor 201 may include a number of different areas (also referred to as sections), for example, including a quality control and packaging area 221, a warehouse area 223, a work/assembly line area 225, a raw material storage area 227, and a purchasing area 229. Moreover, each area may be provided with a respective radio stripe 121 including a respective plurality of APUs 101 (with respective antennas) and coupled with a respective controller 300 as discussed above with respect to FIGS. 1A, 1B, and 1C. While a respective radio stripe 121 is shown for each area in FIG. 2 by way of example, a same radio stripe 121 (and respective controller) may be provided for two or more of the areas.

In a Smart Manufacturing/Factory scenario, the shop-floor 201 layout may be crucial for the following reasons:
1. An appropriate/improved shop-floor layout may streamline the process of production to enable smooth flow of process;
2. An appropriate/improved shop-floor layout may increase productivity;
3. An appropriate/improved shop-floor layout may provide adherence to occupational health and standards;
4. An appropriate/improved shop-floor layout may provide/maintain sufficient space for a volume of production; and/or
5. An appropriate/improved shop-floor layout may provide appropriate location of stock and/or inventory.

To make a factory "smart," the various Information Technology (IT) and Operational Technology (OT) services should be connected to provide efficiencies in the process of production. Ubiquitous coverage, low latency, ultra-reliable communication, and/or resilience may be important for wireless communications in a factory environment. The configuration of network connectivity network may be important since it can be dynamic depending on the production schedule.

The flexible distributed cell-free architecture of a Radio Stripes System, with its macro-diversity gain and inherent ability to suppress interference, may be useful to cope with the requirements of this scenario.

The factory shop-floor 201 may undergo layout changes depending on the production schedule. Sometimes the inventory or the packaging area may need to be situated close to enable smooth transition in the production process. It may be difficult, however, to keep changing the network setup to meet such requirements. This may result in inefficiency and/or wastage of time and/or resources to enable network connectivity around the areas in a factory. Some embodiments of inventive concepts achieve this smoothly with reduced/minimal configuration and efficient planning of the network setup. Machine Learning (ML) and radio stripes may be combined according to such embodiments.

As shown in FIG. 2, the alignment of Radio stripes 121 around the various sections/areas of the shop-floor is proposed with APUs 101 provided on the radio stripes as discussed above with respect to FIGS. 1A, 1B, and 1C. This approach focusses on the respective controller 300 selecting the appropriate APUs 101 to be turned ON/OFF (activated/deactivated) on each Radio Stripe 121 depending on the recommendation of the ML agent (e.g., implemented on processor 303 of controller 300) that uses Q-learning, where Q-learning is a form of Reinforcement learning that does not require a model. The goal of this online learning is to learn a policy which helps the agent to take action [in this case turning APU's on/off] that may be useful/necessary for the current state. Hence, the rewards are calculated in successive steps to reach the future reward. It is assumed that the system learns from the initial placement of the APUs 101 with the values being stored in a Q-table (e.g., using memory 305 of controller 300). This may not be the optimal training feature(s) but this may be updated when a better policy is learned and used for inferencing subsequent passes. This may further be used for feedback to the agent (e.g., implemented using processor 303 of controller 300) whenever a better policy is found. This agent takes into consideration the inputs such as the Radio measurements (e.g., Reference Signal Received Power RSRP, etc.) previous layouts/positioning, SLA requirements of this present production schedule, etc., used to determine which set of APUs on the Stripe should be turned on for increased/maximum utilization and/or reduction of wastage of valuable resources.

Figure 3B:
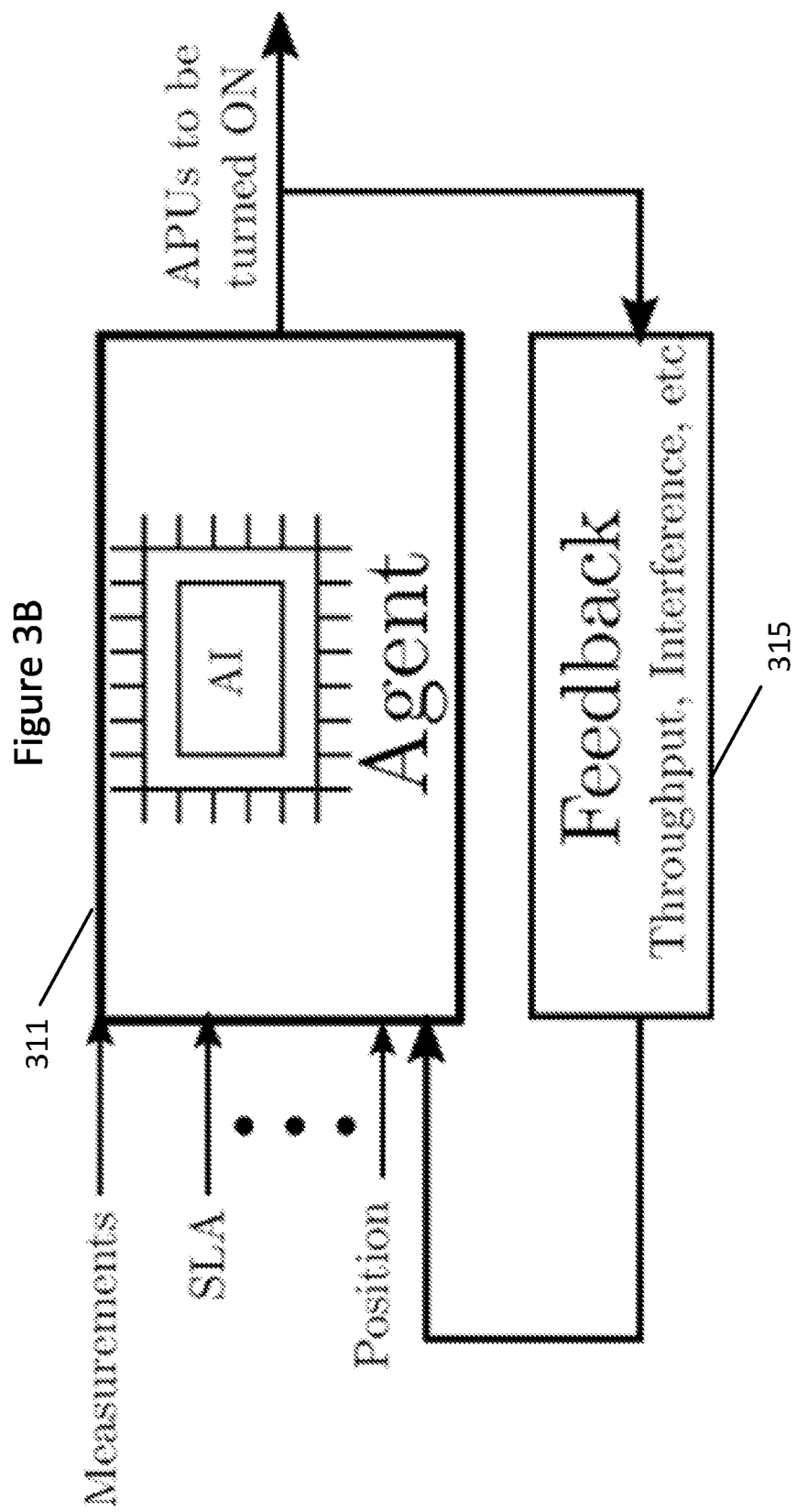
FIG. 3B is a block diagram illustrating a machine learning agent that may be implemented by the radio stripe controller of FIG. 3A according to some embodiments of inventive concepts.

FIG. 3B illustrates embodiments of a machine learning (ML) agent 311 (also referred to as an agent) that can use artificial intelligence (AI) based techniques such as reinforcement learning to determine the appropriate APUs that should be turned "ON/OFF" in a radio stripes environment to increase/maximize utility such as throughput/interference/battery-power/etc. As discussed above, the ML agent may be implemented using processor 303 of controller 300.

Thus, the ML agent 311 of FIG. 3B may consider the above-mentioned parameters and take the feedback 315 from the current setup and usage along with allocation details to determine the set of APUs 101 to be used (i.e., the APUs to be turned on and the APUs to be turned off). The inference from this ML agent 311 will be the input for a setup illustrated in FIG. 2.

The sequence diagrams for the training and prediction phases are discussed below with respect to FIGS. 4 and 5.

Figure 4:
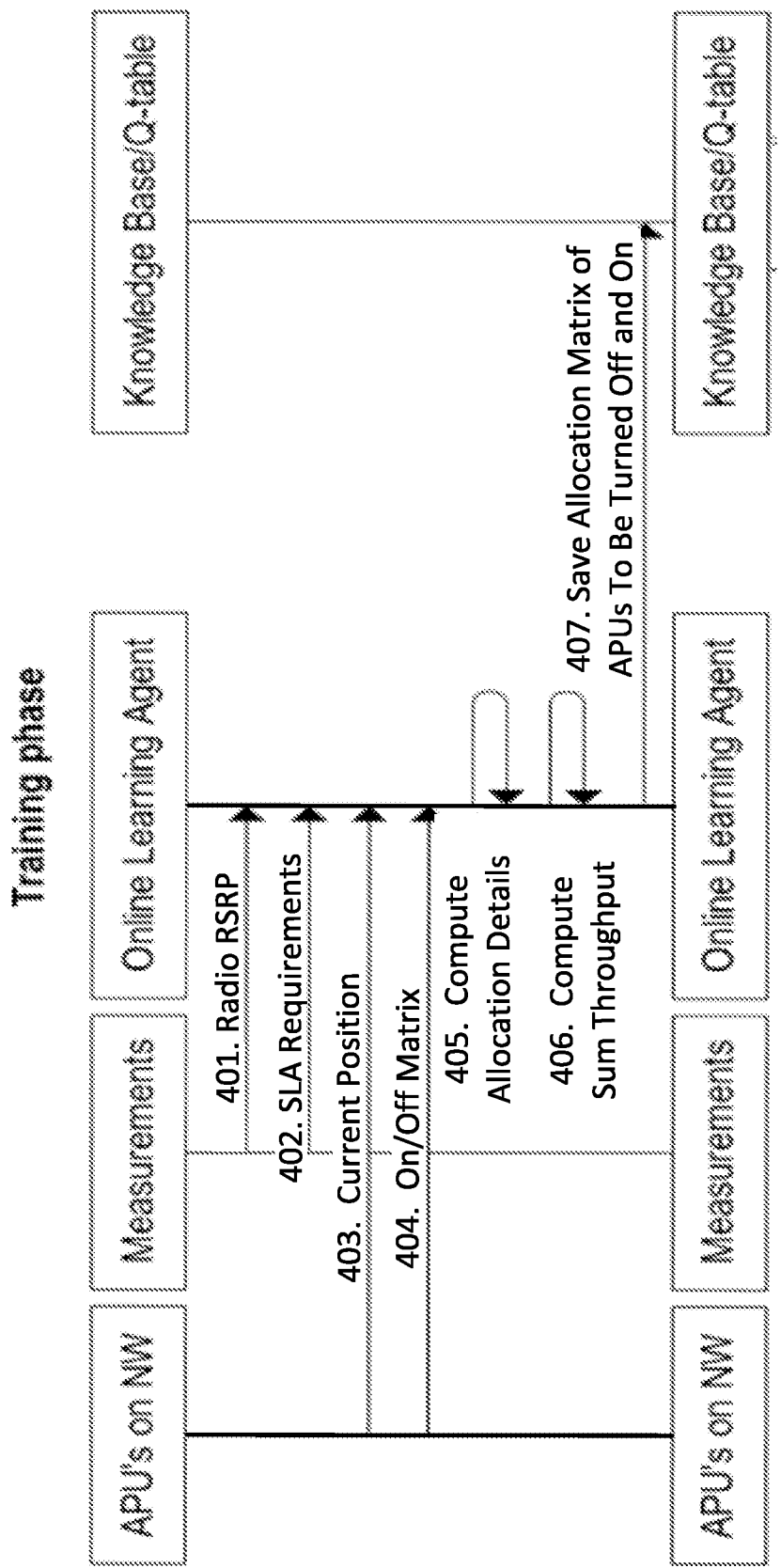
FIG. 4 is a diagram illustrating a training phase that may be performed by the radio stripe controller of FIGS. 3A and 3B according to some embodiments of inventive concepts.

FIG. 4 illustrates the Training phase that may be implemented by processor 303 of controller 300 using the ML agent 311 of FIG. 3B according to some embodiments of inventive concepts. The training process involves learning a policy to improve/optimize a reward parameter based on the observations. In FIG. 4, the training process is described with sum throughput as a reward parameter. For the reported measurement data such as RSRP (Reference Signal Received Power) measurements from UEs at operation 401, the SLA at the time at operation 402, current positions of APUs at operation 403, ON/OFF status of the APUs at operation 404, etc., may be used. At operation 405, Different actions of choosing various allocations/combinations of APU states (i.e., sets of APUs that are on and off) are tried, and at operation 406, the observed sum throughput is captured in the Knowledge Base (KB)/Q-table that may be stored in memory 305. This table provides the performance (sum throughput) for a given combination of state (RSRP measurements, SLA, APU positions, etc.) and action (APU on/off states/matrix).

During the training phase of FIG. 4, parameters that define a current environmental condition may thus include radio measurements (e.g., RSRP) received (through bus 123 and APU interface 307) from active/on APUs, SLA requirements, APU status information (e.g., current APU positions and/or on/off condition) received (through bus 123 and APU interface 307) from active/on APUs, etc. Each APU, for example, may generate information defining its position using a global positioning system GPS receiver, and this information may be transmitted through bus 123 to controller 300. These parameters (measurements, status, etc.) may be received by the online machine learning agent (e.g., implemented using processor 303) and used to define a current environmental condition for the communication system including the radio stripe. The online machine learning agent 311 (e.g., implemented using processor 303) may then compute allocation details and/or sum throughput based on the parameters defining the environmental condition to determine a corresponding allocation matrix (also referred to as an APU activation/deactivation state) that defines APUs to be turned on/off for the corresponding environmental condition (where the allocation matrix of APUs defines one subset of APUs to be turned on/activated and another subset of APUs to be turned off/deactivated), and the allocation matrix (APU activation/deactivation state) may be stored in a knowledge based/Q-table of memory 305 at operation 407.

This process may be repeated for a plurality of different environmental conditions (e.g., based on radio measurements, positions of APUSs, positions of UEs, applicable SLA, etc.) so that the knowledge base/Q-table in memory 305 provides a plurality of APU activation/deactivation states for a respective plurality of environmental conditions.

Figure 5:
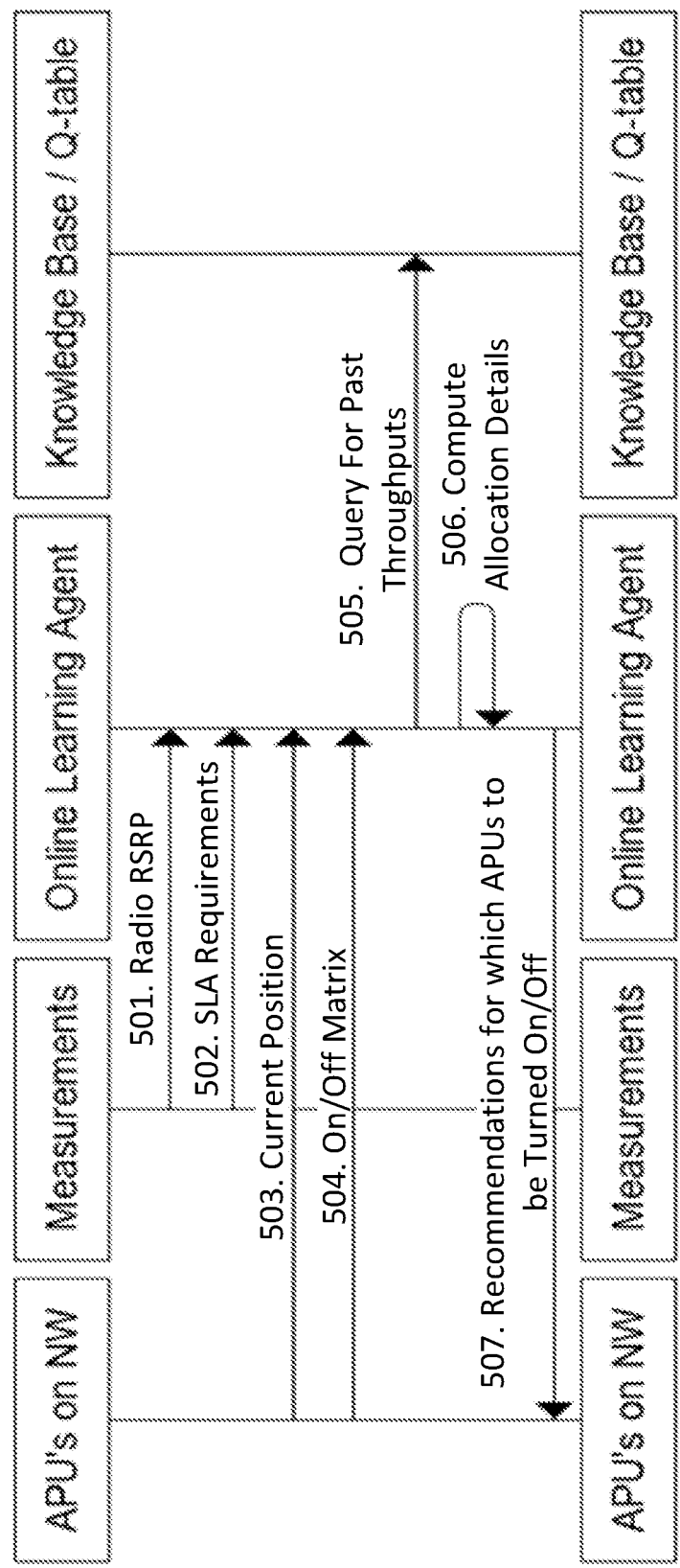
FIG. 5 is a diagram illustrating a prediction phase that may be performed by the radio stripe controller of FIGS. 3A and 3B according to some embodiments of inventive concepts.

FIG. 5 illustrates the Prediction Phase. In the prediction phase of FIG. 5, the ML agent may query the KB/Q-table to recommend which set of APU's should/must be turned on/off (i.e., which APU activation/deactivation state from the KB/Q-table should be applied) based on the current environmental condition. The ML agent may receive radio RSRP measurements from UEs at operation 501, SLA requirements at operation 502, current positions of APUs at operation 503, and an on/off matrix (defining a current on/off status of each APU) at operation 504. At operation 505, the ML agent may query the knowledge-base/Q-table for past throughputs, and at operation 506, the ML agent may compute allocation details based on the information from operations 501, 502, 503, 504, and 505. Based on computing the allocation details at operation 506, recommendations for which APUs to be turned on/off may be provided to the APUs at operation 507. These recommendations, for example, may be used by processor 303 of controller 300 to generate a new on/off matrix that is used to turn on/off different subsets of the APUs.

In yet other embodiments, an opportunistic coverage for UEs in an enclosed area (such as shopping malls) can be derived using techniques discussed above. Here, the APUs may be turned ON/OFF (activated/deactivated) (refer to FIG. 4) based on information such as Channel measurements that UEs are experiencing; Positions of various UEs; SLAs to be met, etc.

To determine the APUs that are to be chosen to improve/optimize performance objectives, a centralized ML agent can be trained using the training data. This is further discussed above with respect to FIG. 3B for previous embodiments. This training data can be captured for various UE deployments/settings manually. During the live or active phase, the decisions from the knowledge-base/Q-Table can be used to control which APUs should be turned "ON" (activated) and which APUs should be turned "OFF" deactivated. For example, the ML agent can be trained to turn "ON" multiple APUs in the radio stripes based on the collective channel conditions that UEs experience to increase/maximize a global metric such as throughput. Estimation of APUs to be turned "ON" and "OFF" can also be improved by using a feedback mechanism as shown in FIG. 3B.

Figure 6:
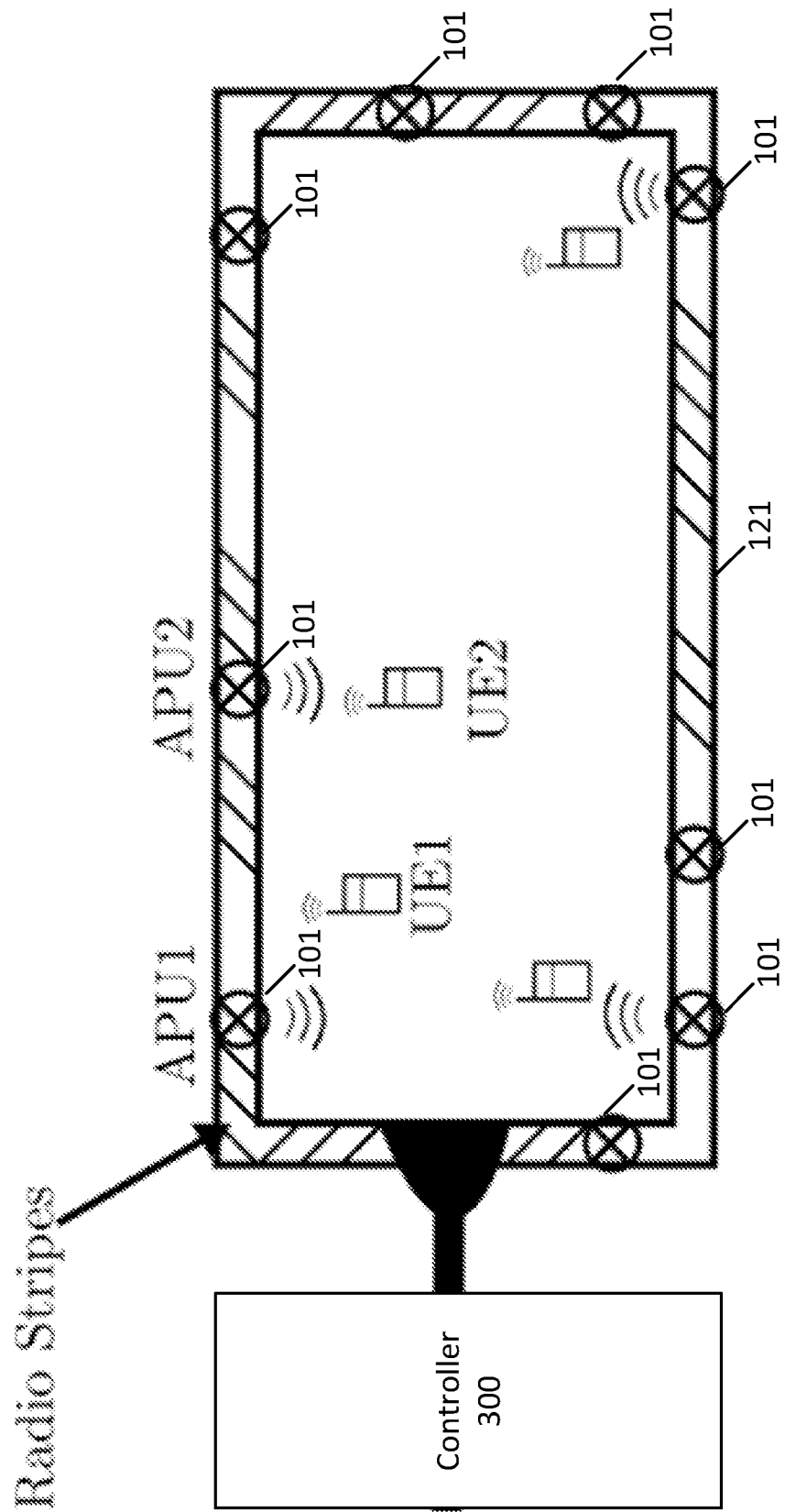
FIG. 6 is a diagram illustrating APUs in a radio stripe that is controlled (turned "ON/OFF") using an ML agent according to some embodiments of inventive concepts.

FIG. 6 illustrates APUs 101 in a radio stripe(s) 121 being controlled (turned "ON/OFF") using an ML agent implemented in Controller 300.

Consider the scenario illustrated in FIG. 6. As shown, it may be effective to turn ON the APU1 for UE1 rather than APU2 (which may be more suitable to service UE2). This may be important as it may help to reduce the signal interference and provide more seamless coverage in such an environment. All these policies may be learned and used for inferencing to enable the agent to recommend the set of APU's to be turned ON/OFF per the SLA requirements.

Figure 7:
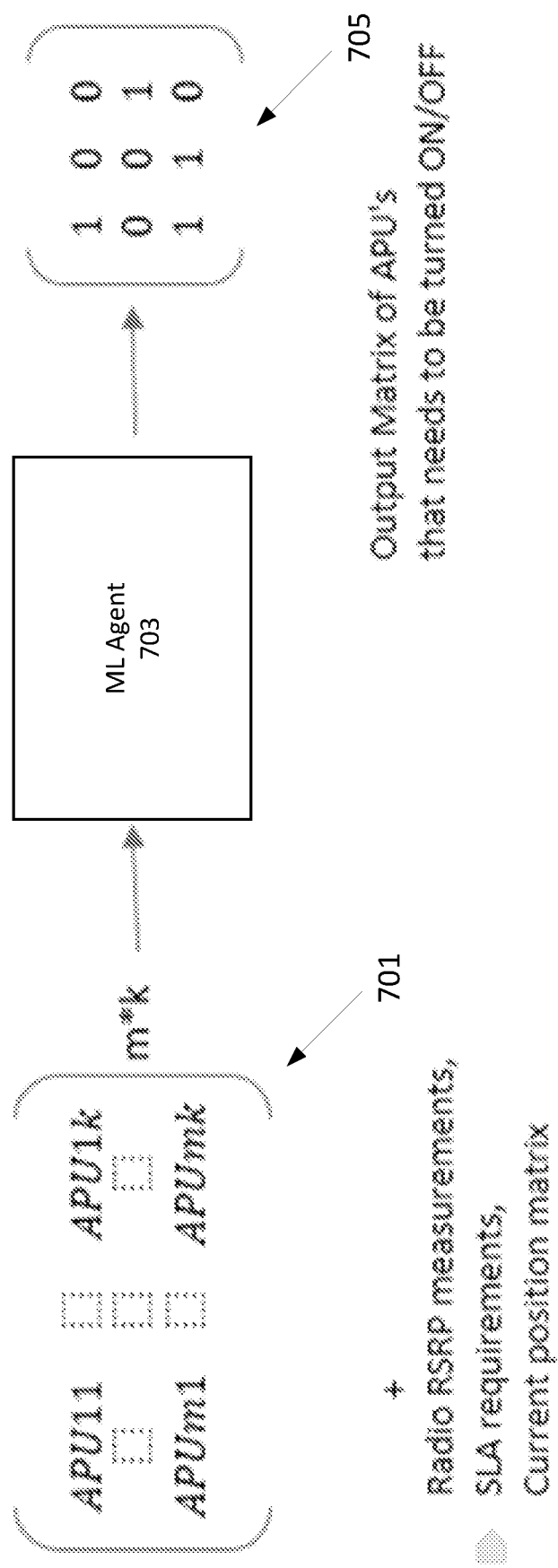
FIG. 7 is a diagram illustrating a matrix of APUs according to some embodiments of inventive concepts.

FIG. 7 illustrates an example matrix 701 of APUs capturing x,y coordinates of the APU locations which along with other inputs mentioned with respect to FIG. 5 may be fed to the agent 703 (e.g., implemented in controller 300) which then based on query results from the Q-table will help to recommend the output matrix 705 of APUs. In an alternative, this position/location in matrix 701 can be just an on/off (activated/deactivated) state vector too depending on requirements of the use-case.

According to some embodiments of inventive concepts, input matrix 701 may provide a current APU activation/deactivation state for the APUs 101 of a radio stripe 121, for example, with each element of input matrix 701 representing a respective APU 101, with a "1" indicating an APU in an activated state and with a "0" indicating an APU in a deactivated state. Input matrix 701 may be considered by ML agent 703 together with other input information (such as Radio RSRP measurements, SLA requirements, a current position matrix indicating positions of the APUs, positions of UEs serviced by the APUs, etc.) to determine the output matrix 705 providing a next APU activation/deactivation state for the APUs 101 of the radio stripe 121. For example, with each element of the output matrix 705 may represent a respective APU 101, with a "1" indicating an APU in an activated state and with a "0" indicating an APU in a deactivated state. Accordingly, the input information (such as Radio RSRP measurements, SLA requirements, a current position matrix indicating positions of the APUs, positions of UEs serviced by the APUs, etc.) may be used to determine when a change in APU activation/deactivation status is needed and what the new APU activation/deactivation status should be as indicated by output matrix 705 (indicating APUs that should be turned on/off).

Another embodiment could include setting up an ad-hoc network in a Stadium used to host a sporting match and where connectivity is important/crucial to keep the audience connected at all times with improved/optimal selection and usage of the APU's without over-provisioning the network.

In order to enable several 5G use-cases, the network should desirably provide high reliability and capacity with low latency. Coupled with this, the network coverage should desirably provide connectivity at all times as this may be of significant/paramount importance to achieve efficiency and/or waste reduction. The concept of distributed MIMO deployments can aid in this as it may provide wireless systems with macro diversity, interference suppression and/or beamforming gains. The Radio stripes can provide a mechanism for distributed MIMO deployment in a compact way and is a revolutionary concept developed by Ericsson. However, in such systems in order to exploit the discussed benefits, it may be important to identify the APUs 101 (on the radio stripes 121) that should be turned "ON/OFF" based on the changing environment. A reinforcement learning based machine learning apparatus proposed herein may assist in this endeavor.

Operations of a radio stripe controller 300 (implemented using the structure of FIG. 3A, also referred to as a controller) will now be discussed with reference to the flow chart of FIG. 8 according to some embodiments of inventive concepts. For example, modules may be stored in memory 305 of FIG. 3A, and these modules may provide instructions so that when the instructions of a module are executed by respective controller processing circuitry 303 (also referred to as a processor), processing circuitry 303 performs respective operations of the flow chart.

As discussed above with respect to FIGS. 1A, 1B, and 3A, a wireless communication system may include a radio stripe 121 having a plurality of APUs 101 distributed along the radio stripe and a bus 123 that provides coupling between controller 300 and each of the APUs 101 along the radio stripe 121. As shown in FIG. 3A, controller 300 may include an APU interface coupling processing circuitry 303 with APUs 101 of radio stripe 121 through bus 123.

At block 801, processing circuitry 303 may generate a plurality of activation/deactivation states where each one of the plurality of APU activation/deactivation states defines APUs 101 of the plurality of APUs 101 that are activated (e.g., ON) and APUs of the plurality of APUs 101 that are deactivated (e.g., OFF) for the respective one of the plurality of environmental conditions. The activation/deactivation states may be generated using reinforcement learning based on an initial input including at least one of radio measurements from one or more of the APUs 101, positions of the APUs 101, positions of user equipments UEs, and/or Service Level Agreements governing service provided using the radio stripe 121, and based on feedback (e.g., from APUs 101 as discussed above with respect to FIG. 3B) including at least one of throughput, interference, and/or battery power. For example, the plurality of activation/deactivation states may be generated using Q-learning to provide a Q-table including the plurality of activation/deactivation states. While controller 300 may generate and store the activation/deactivation states according to some embodiments, the activation/deactivation states may be generated and/or stored outside of controller 300 and made available and/or provided to controller 300 according to some other embodiments.

For the activation/deactivation states each of the respective environmental conditions may be defined based on at least one of radio measurements from one or more of the APUs, positions of the APUs, positions of user equipments UEs serviced by the APUs, and/or Service Level Agreements governing service to be provided using the radio stripe. According to some embodiments, for example, each respective environmental condition may be defined based on a respective set of radio measurements from one or more of the APUs, such that the sets of radio measurements are different for at least some of the different activation/deactivation states. In addition or in an alternative, each respective environmental condition may be defined based on a respective set of positions of the APUs, such that the sets of positions of the APUs are different for at least some of the different activation/deactivation states. In addition or in another alternative, each respective environmental condition may be defined based on a respective set of positions of the user equipments (UEs), such that sets positions of the UEs are different for at least some of the different activation/deactivation states.

At block 803, processing circuitry 303 may provide access to the plurality of APU activation/deactivation states for the respective plurality of environmental conditions. For example, the APU activation/deactivation states may be stored in memory 305 of controller, or the APU activation/deactivation states may be stored in a database/table/memory outside of controller with access being provided through a communication interface.

At block 807, processing circuitry 303 may detect a current environmental condition. As discussed above, the environmental condition may be defined based on at least one of radio measurements from one or more of the APUs, positions of the APUs, positions of UEs, and/or Service Level Agreements governing service to be provided using the radio stripe.

Responsive to detecting a change in the environmental condition to a first one of the plurality of environmental conditions at block 809, processing circuitry 303 may apply a first one of the plurality of APU activation/deactivation states corresponding to the first one of the plurality of environmental conditions to activate a first subset of the APUs and to deactivate a second subset of the APUs, where the first and second subsets of APUs are mutually exclusive. For example, the first subset of APUs may be activated by turning the first subset of APUs on, and the second subset of APUs may be deactivated by turning the second subset of APUs off.

At block 815, processing circuitry 303 may provide wireless communication through APU interface 307, bus 123, and the first subset of APUs responsive to detecting the first one of the plurality of environmental conditions and responsive to applying the first APU activation/deactivation state. As shown by the logical loop(s) and decision block 809 of FIG. 8, processing circuitry 303 may continue providing wireless communications using the first subset of APUs based on the first activation/deactivation state until a change in environmental condition is detected at blocks 807 and 809 to prompt application of a another/new APU activation/deactivation state at block 811.

Accordingly, at blocks 807 and 809, processing circuitry 303 may detect a change in the environmental condition from the first environmental condition (discussed above) to a second one of the plurality of environmental conditions (different than the first environmental condition, also referred to as a new/different environmental condition). Responsive to detecting the change from the first environmental condition to the second environmental condition at block 809, processing circuitry 303 may apply a second one of the plurality of APU activation/deactivation states corresponding to the second one of the plurality of environmental conditions to activate a third subset of the APUs and to deactivate a fourth subset of the APUs. For example, the third subset of APUs may be activated by turning the third subset of APUs on, and the fourth subset of APUs may be deactivated by turning the fourth subset of APUs off. With the second activation/deactivation state, the third and fourth subsets of APUs are mutually exclusive, the first and third subsets of APUs are different, and the second and fourth subsets of APUs are different. Stated in other words, the APUs that are activated/on based on the first and second APU activation/deactivation states are different, and the APUs that are deactivated/off based on the first and second APU activation/deactivation states are different.

At block 815, processing circuitry 303 may provide wireless communication through APU interface 305, bus 123, and the second subset of APUs responsive to detecting the second one of the plurality of environmental conditions and responsive to applying the second APU activation/deactivation state. As shown by the logical loop(s) and decision block 809 of FIG. 8, processing circuitry 303 may continue providing wireless communications using the second subset of APUs based on the second activation/deactivation state until a change in environmental condition is detected at blocks 807 and 809 to prompt application of a another/new APU activation/deactivation state at block 811.

Figure 8:
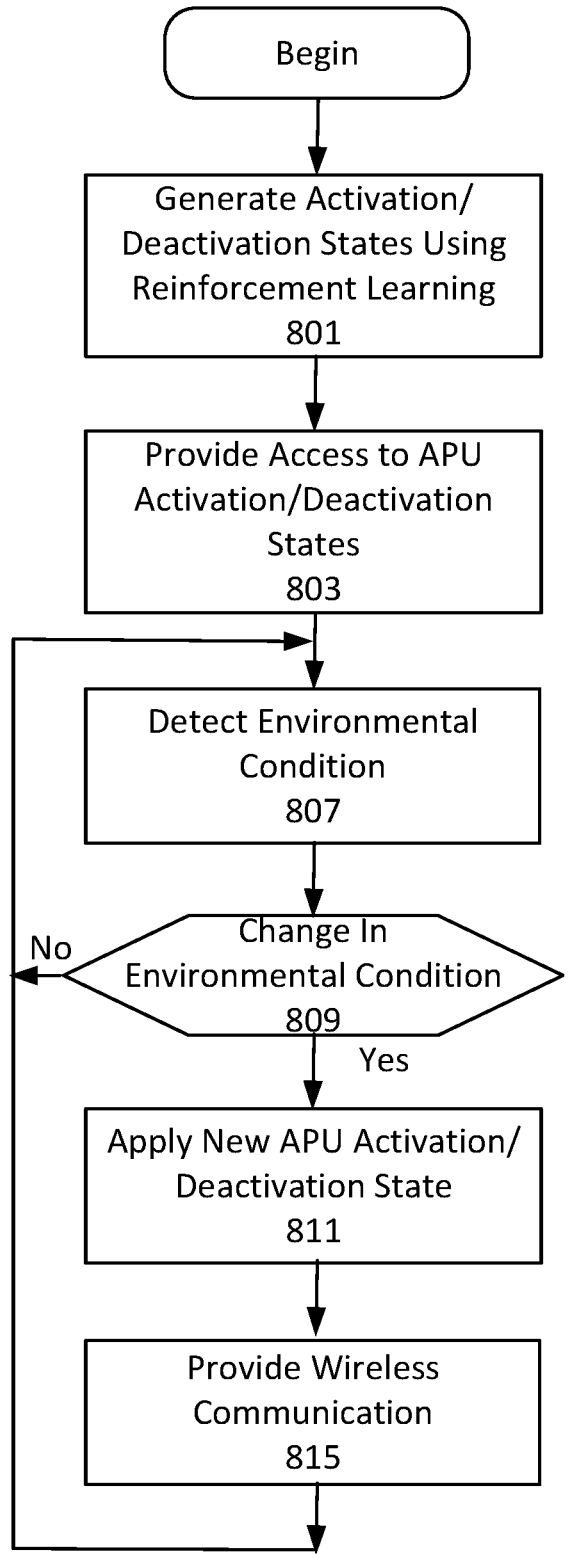
FIG. 8 is a flow chart illustrating operations of the radio stripe controller of FIG. 3A according to some embodiments of inventive concepts.

Operations of FIG. 8 may thus be performed to move between different ones of the APU activation/deactivation states responsive to changes in environmental conditions. By activating (e.g., turning on) and deactivating (e.g., turning off) different ones of the APUs based on changing environmental conditions, interference management, throughput performance, network adaptability, and/or power utilization may be improved.

Various operations from the flow chart of FIG. 8 may be optional with respect to some embodiments of radio stripe controllers and related methods. For example, operations of blocks 801, 807, 809, and 815 of FIG. 8 may be optional according to some embodiments.

As discussed above, different APU activation/deactivation states may be provided for different environmental conditions where each activation/deactivation state defines APUs that are activated and APUs that are deactivated for the respective APU activation/deactivation state. According to some embodiments, activated APUs may be turned on and deactivated APUs may be turned off, and according to such embodiments, bus 123 may include a separate power connection for each APU allowing controller 300 to separately apply power to activated APUs while blocking power to deactivated APUs. According to some other embodiments, activated APUs may be instructed by processor/controller 303/300 (through APU interface 307 and bus 123) to fully turn on to power both digital signal processor 111 and transceiver 109 while deactivated APUs may be instructed by processor/controller 303/300 (through APU interface 307 and bus 123) to turn off transceiver 109 while maintaining power to digital signal processor 111. By maintaining power to digital signal processor 111 (or portions thereof) of a deactivated APU, the DSP of the deactivated APU can monitor signaling on bus 123 for a later activation instruction from controller 300, so that separate power couplings for each APU may be omitted. According to still other embodiments, controller 300 may control activation/deactivation states of respective APUs by configuring activated APUs to provide communication while configuring deactivated APUs to remain idle (without turning power off for deactivated APUs, either whole or in part).

References are identified below.
[1] Chiaravigli, F. Cuom, M. Maisto, and H Zhang, "What Is the Best Spatial Distribution to Model Base Station Density? A Deep Dive Into Two European Mobile Networks," IEEE access, April 2016
[2] P. Singh and J. Jindal, "Various Stategies for 4G Cellular Tower Placement: A Review", Int. J. Elec&Elecn.Eng&Telcomm, Vol. 6, No. 1, January 2017
[3] Erica Ernfors, "Radio Stripes: re-thinking mobile networks," Feb. 25, 2019, https://www.ericsson.com/en/blog/2019/2/radio-stripes
[4] Molly Powell, "Distributed Massive MIMO using Ericsson Radio Stripes," Apr. 9, 2019, https://mollydpowellusblog.wordpress.com/2019/04/09/distributed-massive-mimo-using-ericsson-radio-stripes/

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 9:
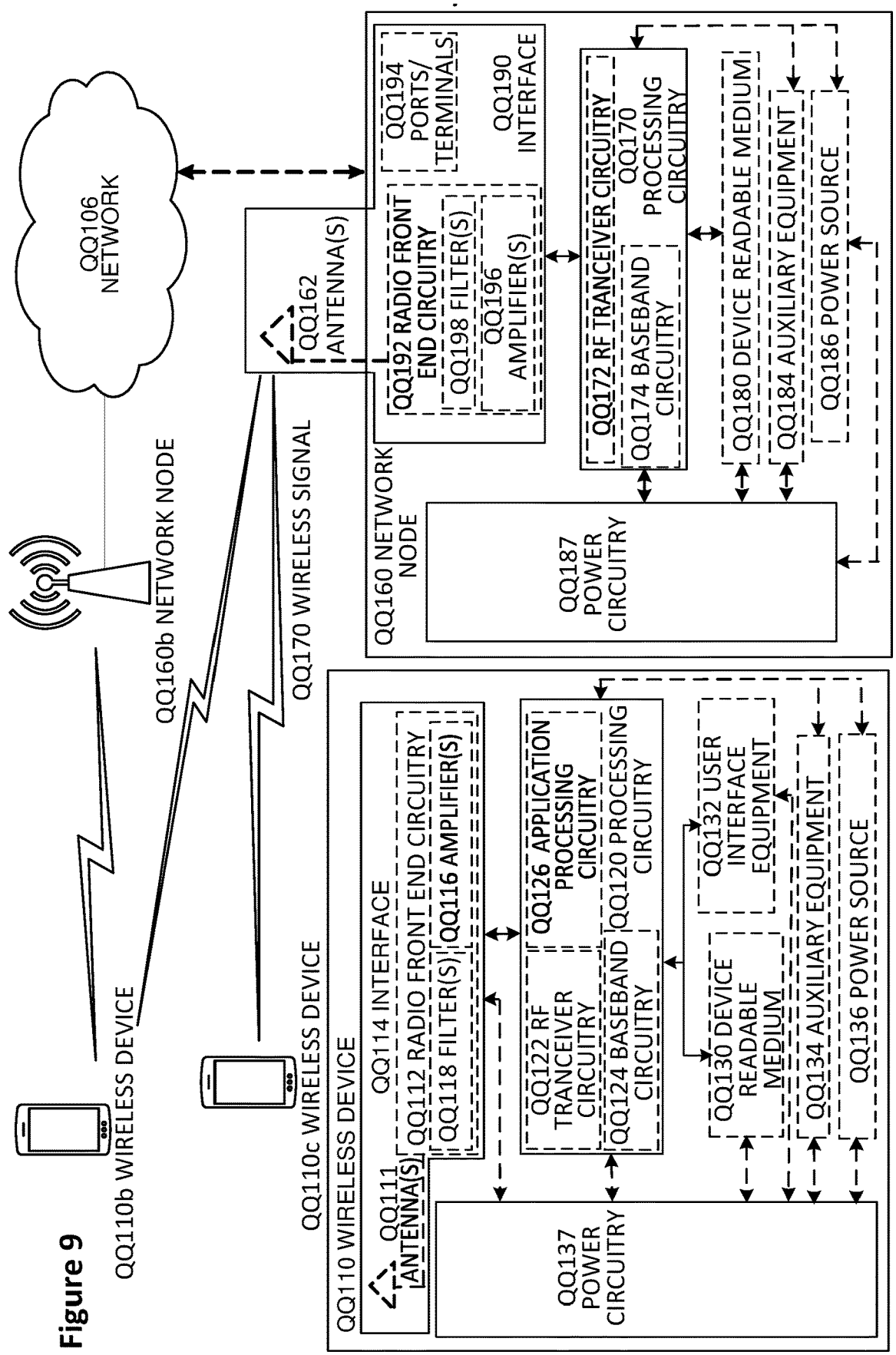
FIG. 9 is a block diagram of a wireless network in accordance with some embodiments.

FIG. 9 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 9 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 10:
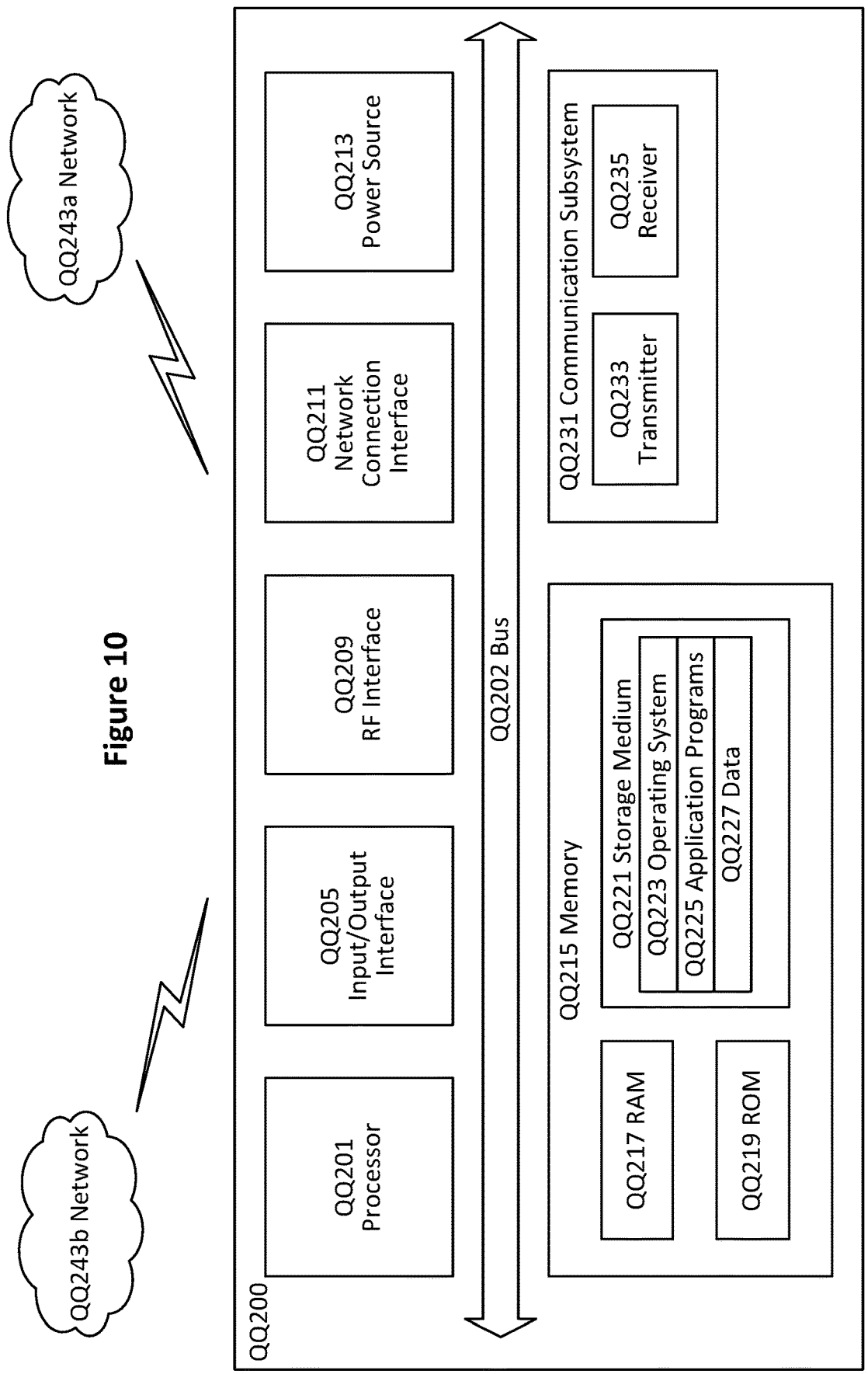
FIG. 10 is a block diagram of a user equipment in accordance with some embodiments

FIG. 10 illustrates a user Equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 10, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/ or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 11:
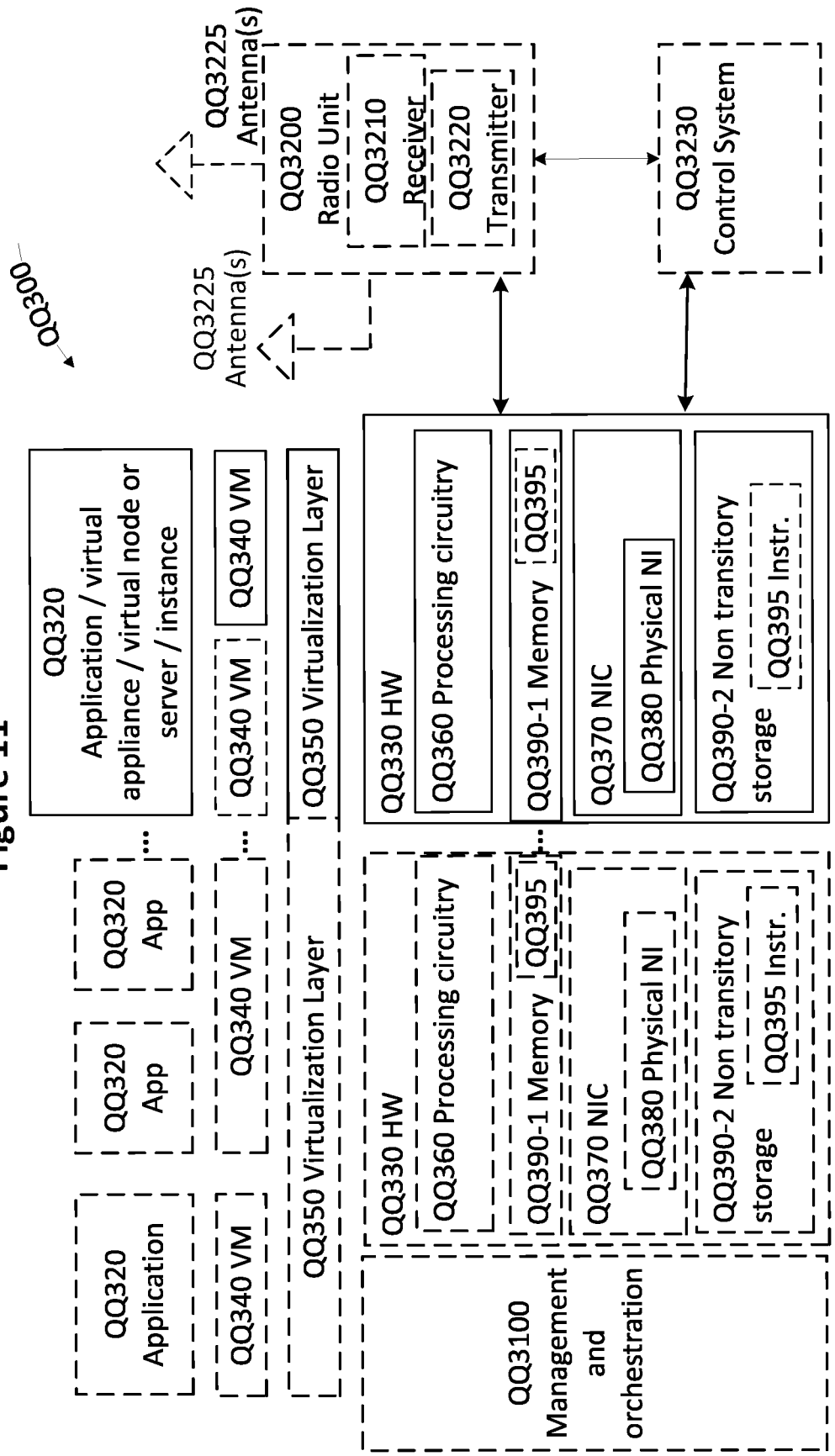
FIG. 11 is a block diagram of a virtualization environment in accordance with some embodiments.

FIG. 11 illustrates a virtualization environment in accordance with some embodiments.

FIG. 11 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 11, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 11.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 12:
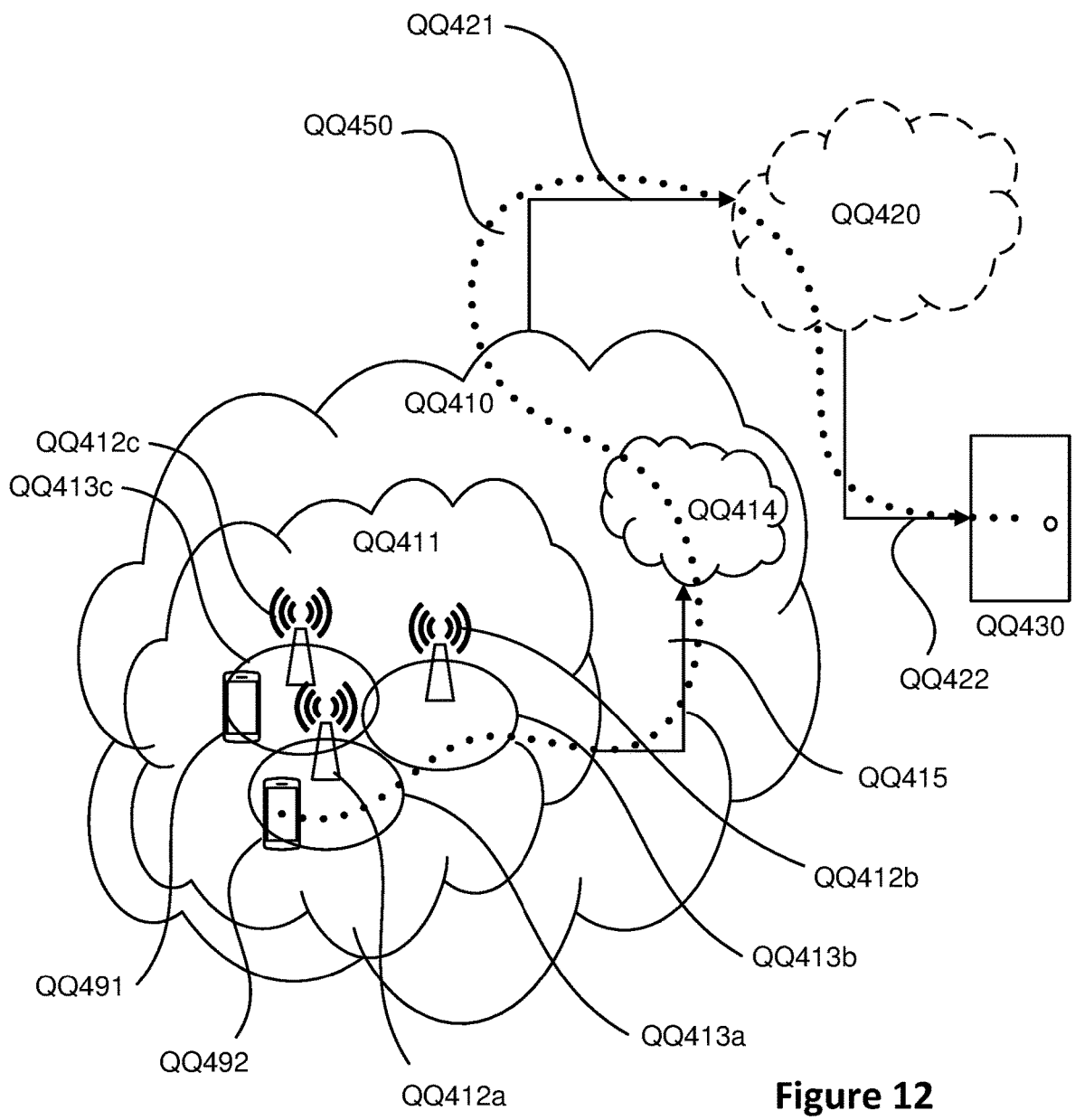
FIG. 12 is a block diagram of a telecommunication network connected via an intermediate network to a host computer in accordance with some embodiments.

FIG. 12 illustrates a telecommunication network connected via an intermediate network to a host computer in accordance with some embodiments.

With reference to FIG. 12, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 12 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 13:
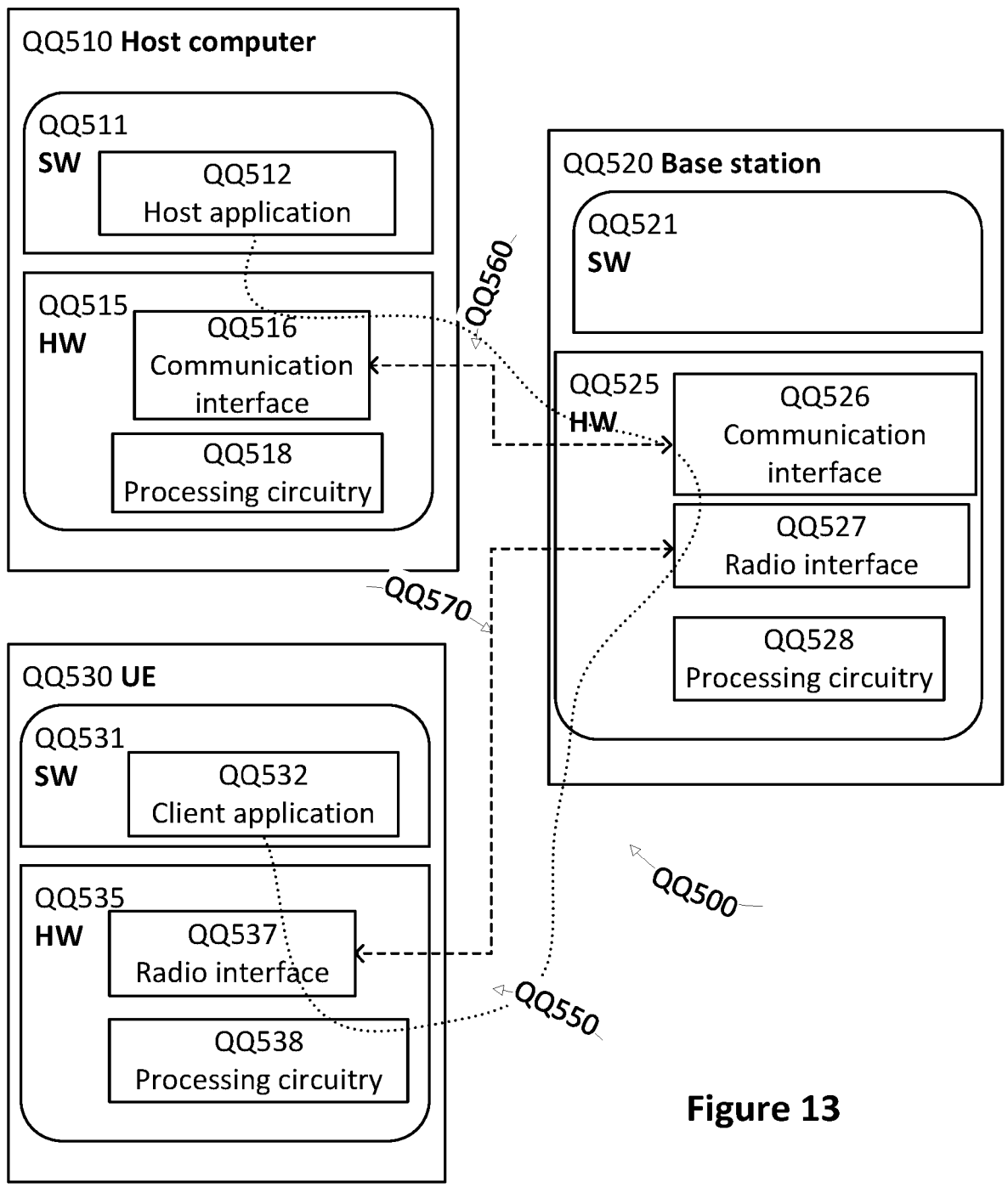
FIG. 13 is a block diagram of a host computer communicating via a base station with a user equipment over a partially wireless connection in accordance with some embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 13) served by base station QQ520. Communication interface QQ526 may be configured to facilitate connection QQ560 to host computer QQ510. Connection QQ560 may be direct or it may pass through a core network (not shown in FIG. 13) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 13 may be similar or identical to host computer QQ430, one of base stations QQ412a, QQ412b, QQ412c and one of UEs QQ491, QQ492 of FIG. 12, respectively. This is to say, the inner workings of these entities may be as shown in FIG. 13 and independently, the surrounding network topology may be that of FIG. 12.

In FIG. 13, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 14:
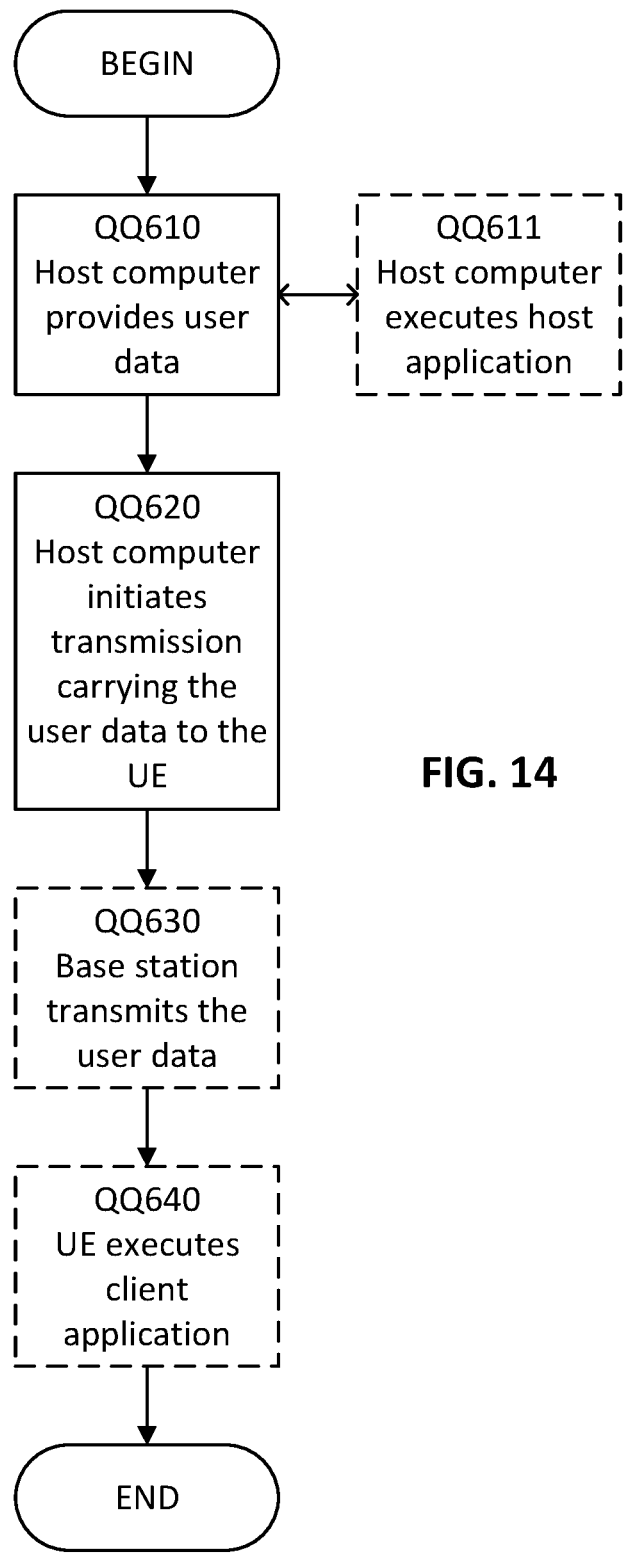
FIG. 14 is a block diagram of methods implemented in a communication system including a host computer, a base station and a user equipment in accordance with some embodiments.

FIG. 14 illustrates methods implemented in a communication system including a host computer, a base station and a user equipment in accordance with some embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 15:
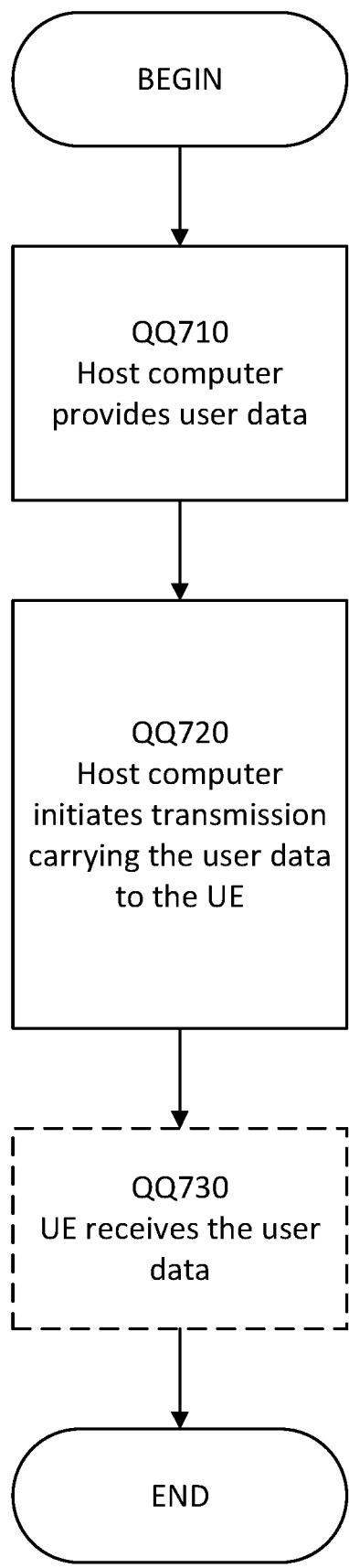
FIG. 15 is a block diagram of methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to Figures Q12 and 13. For simplicity of the present disclosure, only drawing references to FIG. 15 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 16:
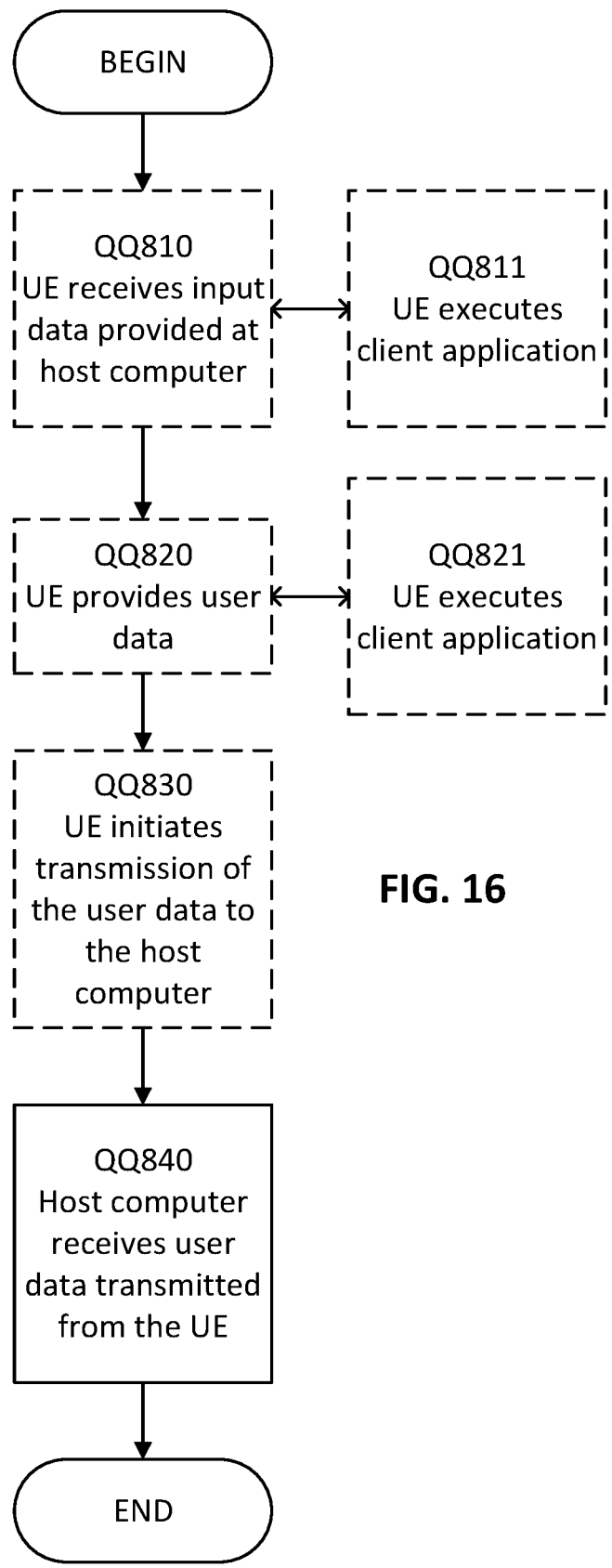
FIG. 16 is a block diagram of methods implemented in a communication system including a host computer, a base station and a user equipment in accordance with some embodiments.

FIG. 16 illustrates methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 17:
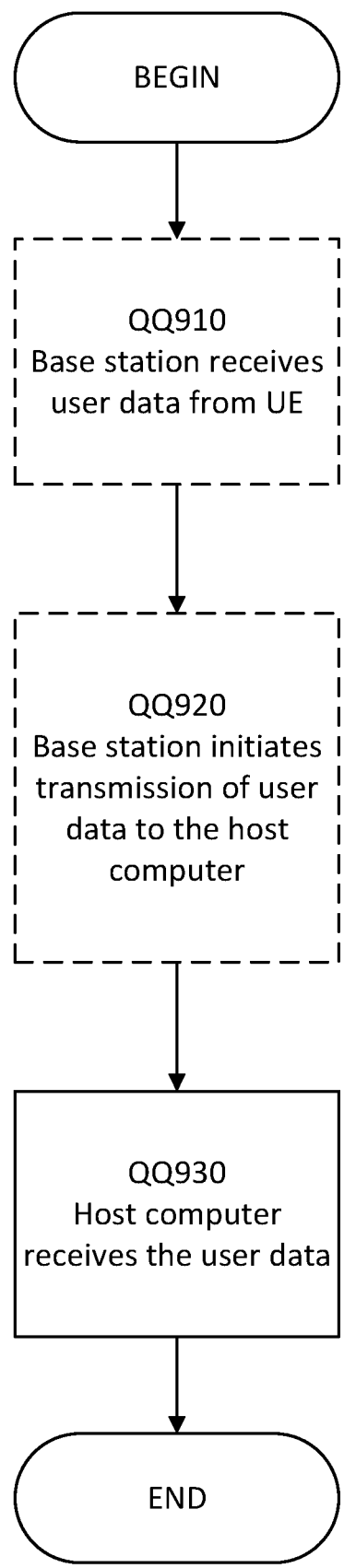
FIG. 17 is a block diagram of methods implemented in a communication system including a host computer, a base station and a user equipment in accordance with some embodiments.

FIG. 17 illustrates methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
APU Antenna Processing Unit
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CPU Central Processing Unit
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access HRPD High Rate Packet Data
IoT Internet of Things
IT Information Technology
KB Knowledge Base
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MIMO Multiple Input Multiple Output
ML Machine Learning
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
OT Operational Technology
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SLA Service Level Agreement
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated as "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method providing wireless communication using a plurality of Antenna Processing Units, APUs, distributed along a radio stripe and sharing a bus along the radio stripe, the method comprising:
providing access to a plurality of APU activation/deactivation states for a respective plurality of environmental conditions, wherein each one of the plurality of APU activation/deactivation states defines APUs of the plurality of APUs that are activated and APUs of the plurality of APUs that are deactivated for the respective one of the plurality of environmental conditions; and
responsive to detecting a first one of the plurality of environmental conditions, applying a first one of the plurality of APU activation/deactivation states corresponding to the first one of the plurality of environmental conditions to activate a first subset of the APUs and to deactivate a second subset of the APUs, wherein the first and second subsets of APUs are mutually exclusive.

2. The method of claim 1 further comprising:
responsive to detecting a second one of the plurality of environmental conditions different than the first environmental condition, applying a second one of the plurality of APU activation/deactivation states corresponding to the second one of the plurality of environmental conditions to activate a third subset of the APUs and to deactivate a fourth subset of the APUs, wherein the third and fourth subsets of APUs are mutually exclusive, wherein the first and third subsets of APUs are different, and wherein the second and fourth subsets of APUs are different.

3. The method of claim 2, wherein activating the first subset of APUs comprises turning the first subset of APUs on, wherein deactivating the second subset of APUs comprises turning the second subset of APUs off, wherein activating the third subset of APUs comprises turning the third subset of APUs on, and wherein deactivating the fourth subset of APUs comprises turning the fourth subset of APUs off.

4. The method of claim 2 further comprising:
providing wireless communication through the bus and the first subset of APUs responsive to detecting the first one of the plurality of environmental conditions and responsive to applying the first APU activation/deactivation state; and
providing wireless communication through the bus and the second subset of APUs responsive to detecting the second one of the plurality of environmental conditions and responsive to applying the second APU activation/deactivation state.

5. The method of claim 1, wherein the plurality of APU activation/deactivation states for the respective plurality of environmental conditions are provided in a Q-table.

6. The method of claim 1, wherein each of the environmental conditions is defined based on at least one of radio measurements from one or more of the APUs, positions of the APUs, positions of user equipments (UEs), and/or Service Level Agreements governing service to be provided using the radio stripe.

7. The method of claim 6, wherein the first environmental condition is defined based on a first set of radio measurements from one or more of the APUs, wherein the second environmental condition is defined based on a second set of radio measurements from one or more of the APUs, and wherein the first and second sets of radio measurements are different.

8. The method of claim 6, wherein the first environmental condition is defined based on a first set of positions of the APUs, wherein the second environmental condition is defined based on a second set of positions of the APUs, and wherein the first and second sets of positions of the APUs are different.

9. The method of claim 6, wherein the first environmental condition is defined based on a first set of positions of the user equipments (UEs), wherein the second environmental condition is defined based on a second set of positions of the UEs, and wherein the first and second sets of positions of the UEs are different.

10. The method of claim 1 further comprising:
generating the plurality of activation/deactivation states using reinforcement learning based on an initial input including at least one of radio measurements from one or more of the APUs, positions of the APUs, positions of user equipments (UEs), and/or Service Level Agreements governing service provided using the radio stripe, and based on feedback including at least one of throughput, interference, and/or battery power.

11. The method of claim 10, wherein generating comprises generating the plurality of activation/deactivation states using Q-learning to provide a Q-table including the plurality of activation/deactivation states.

12. A wireless communication system comprising:
a radio stripe including a plurality of Antenna Processing Units, APUs, distributed along the radio stripe and a bus coupled with the plurality of APUs along the radio stripe; and
a controller coupled with the plurality of APUs of the radio stripe using the bus, wherein the controller is configured to,
provide access to a plurality of APU activation/deactivation states for a respective plurality of environmental conditions, wherein each one of the plurality of APU activation/deactivation states defines APUs of the plurality of APUs that are activated and APUs of the plurality of APUs that are deactivated for the respective one of the plurality of environmental conditions, and
apply a first one of the plurality of APU activation/deactivation states corresponding to a first one of the plurality of environmental conditions to activate a first subset of the APUs and to deactivate a second subset of the APUs responsive to detecting the first one of the plurality of environmental conditions, wherein the first and second subsets of APUs are mutually exclusive.

13. The wireless communication system of claim 12, wherein the controller is further configured to,
apply a second one of the plurality of APU activation/deactivation states corresponding to a second one of the plurality of environmental conditions to activate a third subset of the APUs and to deactivate a fourth subset of the APUs responsive to detecting the second one of the plurality of environmental conditions different than the first environmental condition, wherein the third and fourth subsets of APUs are mutually exclusive, wherein the first and third subsets of APUs are different, and wherein the second and fourth subsets of APUs are different.

14. The wireless communication system of claim 13, wherein activating the first subset of APUs comprises turning the first subset of APUs on, wherein deactivating the second subset of APUs comprises turning the second subset of APUs off, wherein activating the third subset of APUs comprises turning the third subset of APUs on, and wherein deactivating the fourth subset of APUs comprises turning the fourth subset of APUs off.

15. The wireless communication system of claim 13, wherein the controller is further configured to,
provide wireless communication through the bus and the first subset of APUs responsive to detecting the first one of the plurality of environmental conditions and responsive to applying the first APU activation/deactivation state, and
provide wireless communication through the bus and the second subset of APUs responsive to detecting the second one of the plurality of environmental conditions and responsive to applying the second APU activation/deactivation state.

16. The wireless communication system of claim 12, wherein the plurality of APU activation/deactivation states for the respective plurality of environmental conditions are provided in a Q-table.

17. The wireless communication system of claim 12, wherein each of the environmental conditions is defined based on at least one of radio measurements from one or more of the APUs, positions of the APUs, positions of user equipments UEs, and/or Service Level Agreements governing service to be provided using the radio stripe.

18. The wireless communication system of claim 17, wherein the first environmental condition is defined based on a first set of radio measurements from one or more of the APUs, wherein the second environmental condition is defined based on a second set of radio measurements from one or more of the APUs, and wherein the first and second sets of radio measurements are different.

19. The wireless communication system of claim 17, wherein the first environmental condition is defined based on a first set of positions of the APUs, wherein the second environmental condition is defined based on a second set of positions of the APUs, and wherein the first and second sets of positions of the APUs are different.

20. The wireless communication system of claim 17, wherein the first environmental condition is defined based on a first set of positions of the user equipments UEs, wherein the second environmental condition is defined based on a second set of positions of the UEs, and wherein the first and second sets of positions of the UEs are different.

* * * * *